US011558639B2

(12) United States Patent
Gao et al.

(10) Patent No.: US 11,558,639 B2
(45) Date of Patent: Jan. 17, 2023

(54) SELECTIVE RESOLUTION VIDEO ENCODING METHOD, COMPUTER DEVICE, AND READABLE STORAGE MEDIUM

(71) Applicant: Tencent Technology (Shenzhen) Company Limited, Shenzhen (CN)

(72) Inventors: Xinwei Gao, Shenzhen (CN); Xunan Mao, Shenzhen (CN); Chenchen Gu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 189 days.

(21) Appl. No.: 16/988,501

(22) Filed: Aug. 7, 2020

(65) Prior Publication Data
US 2020/0374555 A1 Nov. 26, 2020

Related U.S. Application Data

(63) Continuation of application No. PCT/CN2019/090004, filed on Jun. 4, 2019.

(30) Foreign Application Priority Data

Jun. 20, 2018 (CN) .......................... 201810637333.3

(51) Int. Cl.
*H04N 19/593* (2014.01)
*H04N 19/124* (2014.01)
*H04N 19/59* (2014.01)

(52) U.S. Cl.
CPC ......... *H04N 19/593* (2014.11); *H04N 19/124* (2014.11); *H04N 19/59* (2014.11)

(58) Field of Classification Search
None
See application file for complete search history.

(56) References Cited

U.S. PATENT DOCUMENTS 8,391,368 B2 * 3/2013 Cheng ................... H04N 19/82
  375/240.12
8,780,976 B1 * 7/2014 Jia ........................ H04N 19/132
  375/240.02

(Continued)

FOREIGN PATENT DOCUMENTS

CN 101217663 A 7/2008
CN 101461248 A 6/2009

(Continued)

OTHER PUBLICATIONS

Tencent Technology, ISR, PCT/CN2019/090004, dated Aug. 20, 2019, 2 pgs.

(Continued)

*Primary Examiner* — Stuart D Bennett
(74) *Attorney, Agent, or Firm* — Morgan, Lewis & Bockius LLP

(57) ABSTRACT

This application relates to a video encoding method performed at a computer device. The method includes: obtaining an input video frame; determining a processing parameter corresponding to the input video frame; selecting, from candidate processing manners according to the processing parameter, a target processing manner corresponding to the input video frame, the candidate processing manners comprising a full-resolution processing manner and a downsampling processing manner; and encoding the input video frame according to the target processing manner, to obtain encoded data corresponding to the input video frame. Therefore, the target processing manner of the input video frame can be flexibly selected, and the input video frame is encoded according to the target processing manner, to adaptively adjust a resolution of the input video frame, and improve video encoding quality.

18 Claims, 15 Drawing Sheets

Calculate a proportion of a target predicted type code block in a forward encoded video frame ⟶ S702

Determine a target processing manner corresponding to an input video frame according to the proportion ⟶ S704

(56) References Cited

U.S. PATENT DOCUMENTS

| | | |
|---|---|---|
| 2005/0265448 A1 | 12/2005 | Nozawa |
| 2012/0314771 A1* | 12/2012 | Lim ................... H04N 19/463 |
| | | 382/233 |
| 2017/0201739 A1 | 7/2017 | Appia |
| 2017/0208328 A1* | 7/2017 | Kuusela .............. H04N 19/167 |

FOREIGN PATENT DOCUMENTS

| | | | |
|---|---|---|---|
| CN | 102196256 A | | 9/2011 |
| CN | 102308585 A | | 1/2012 |
| CN | 102883157 A | | 1/2013 |
| CN | 103813174 A | | 5/2014 |
| CN | 105959700 A | * 9/2016 | ........... H04N 19/573 |
| CN | 107155107 A | | 9/2017 |
| CN | 108924553 A | | 11/2018 |
| JP | 2016208281 A | | 12/2016 |

OTHER PUBLICATIONS

Tencent Technology, WO, PCT/CN2019/090004, dated Aug. 20, 2019, 5 pgs.
Tencent Technology, IPRP, PCT/CN2019/090004, dated Dec. 22, 2020, 6 pgs.

\* cited by examiner

| ... | ... | ... | ... | ... | ... | ... |
|---|---|---|---|---|---|---|
| ... | C1 | c11 | A1 | a11 | B1 | b11 | ... |
| ... | c13 | c12 | a13 | a12 | b13 | b12 | ... |
| ... | C2 | c21 | A2 | a21 | B2 | b21 | ... |
| ... | c23 | c22 | a23 | a22 | b13 | b22 | ... |
| ... | C3 | c31 | A3 | a31 | B3 | b31 | ... |
| ... | c33 | c32 | a33 | a32 | b33 | b32 | ... |
| | ... | ... | ... | ... | ... | ... | |

| C1 | ... | ... | ... | A1 | ... | ... | ... | B1 |
|---|---|---|---|---|---|---|---|---|
| ... | ... | ... | ... | ... | ... | ... | ... | ... |
| ... | ... | ... | ... | ... | ... | ... | ... | ... |
| ... | ... | ... | ... | ... | ... | ... | ... | ... |
| C2 | ... | ... | ... | A2 | a4 | a8 | a12 | B2 |
| ... | ... | ... | ... | a1 | a5 | a9 | a13 | ... |
| ... | ... | ... | ... | a2 | a6 | a10 | a14 | ... |
| ... | ... | ... | ... | a3 | a7 | a11 | a15 | ... |
| C3 | ... | ... | ... | A3 | ... | ... | ... | B3 |

SELECTIVE RESOLUTION VIDEO ENCODING METHOD, COMPUTER DEVICE, AND READABLE STORAGE MEDIUM

CROSS-REFERENCE TO RELATED APPLICATIONS

This application is a continuation application of PCT Patent Application No. PCT/CN2019/090004, entitled "VIDEO CODING AND DECODING METHOD AND APPARATUS, COMPUTER DEVICE AND READABLE STORAGE MEDIUM" filed on Jun. 4, 2019, which claims priority to Chinese Patent Application No. 201810637333.3, entitled "VIDEO ENCODING METHOD AND APPARATUS, VIDEO DECODING METHOD AND APPARATUS, COMPUTER DEVICE, AND STORAGE MEDIUM" filed Jun. 20, 2018, all of which are incorporated by reference in their entirety.

FIELD OF THE TECHNOLOGY

This application relates to the field of computer technologies, and in particular, to a video encoding method and apparatus, a video decoding method and apparatus, a computer device, and a readable storage medium.

BACKGROUND OF THE DISCLOSURE

With the development of digital media technologies and computer technologies, videos are applied to various fields, such as mobile communication, network monitoring, and network television. With the improvement of hardware performance and screen resolution, users' demand for high-definition videos is increasing.

Under a condition of a limited bandwidth, conventional encoders indiscriminately encode video frames. This may lead to poor video quality in some scenarios. For example, at 750 kbps, when all video frames are indiscriminately encoded, quality of some video frames is poor for encoders such as H.264\H.265\iOS.

SUMMARY

Embodiments of this application provide a video encoding method and apparatus, a video decoding method and apparatus, a computer device, and a readable storage medium, so that a target processing manner of an input video frame can be flexibly selected, and the input video frame is encoded according to the target processing manner, to adaptively adjust a resolution of the input video frame, and improve video encoding quality under a condition of a limited bandwidth. The technical solutions are as follows:

According to an aspect, a video encoding method is provided, applied to a computer device having a processor and memory storing a plurality of computer programs to be executed by the processor, the method including:

obtaining an input video frame;

determining a processing parameter corresponding to the input video frame;

selecting, from candidate processing manners according to the processing parameter, a target processing manner corresponding to the input video frame, the candidate processing manners comprising a full-resolution processing manner and a downsampling processing manner; and encoding the input video frame according to the target processing manner, to obtain encoded data corresponding to the input video frame.

According to another aspect, a computer device is provided, including a memory and a processor, the memory storing a plurality of computer programs, the computer programs, when executed by the processor, causing the processor to perform the operations of the foregoing video encoding method.

According to another aspect, a non-transitory computer-readable storage medium is provided, storing a plurality of computer programs, the computer programs, when executed by a processor of a computer device, causing the computer device to perform the operations of the foregoing video encoding method.

According to another aspect, a computer program product is provided, the computer program product, when run on a computer, causing the computer to perform the video encoding method or the video decoding method according to the foregoing embodiments of this application.

BRIEF DESCRIPTION OF THE DRAWINGS

To describe the technical solutions of the embodiments of this application more clearly, the following briefly describes the accompanying drawings required for describing the embodiments. Apparently, the accompanying drawings in the following description show only some embodiments of this application, and a person of ordinary skill in the art may still derive other accompanying drawings from these accompanying drawings without creative efforts.

DESCRIPTION OF EMBODIMENTS

To make the objectives, technical solutions, and advantages of this application clearer, the following further describes implementations of this application in detail with reference to the accompanying drawings.

It may be understood that the terms "first", "second" and the like used in this application may be used for describing various elements in this specification. However, the elements are not limited by the terms unless otherwise specified. The terms are merely used to distinguish a first element from another element. For example, without departing from the scope of this application, a first threshold may be referred to as a second threshold, and similarly, the second threshold may be referred to as the first threshold. Optionally, a target threshold in embodiments of this application may also be referred to as the second threshold or the first threshold.

Figure 1:
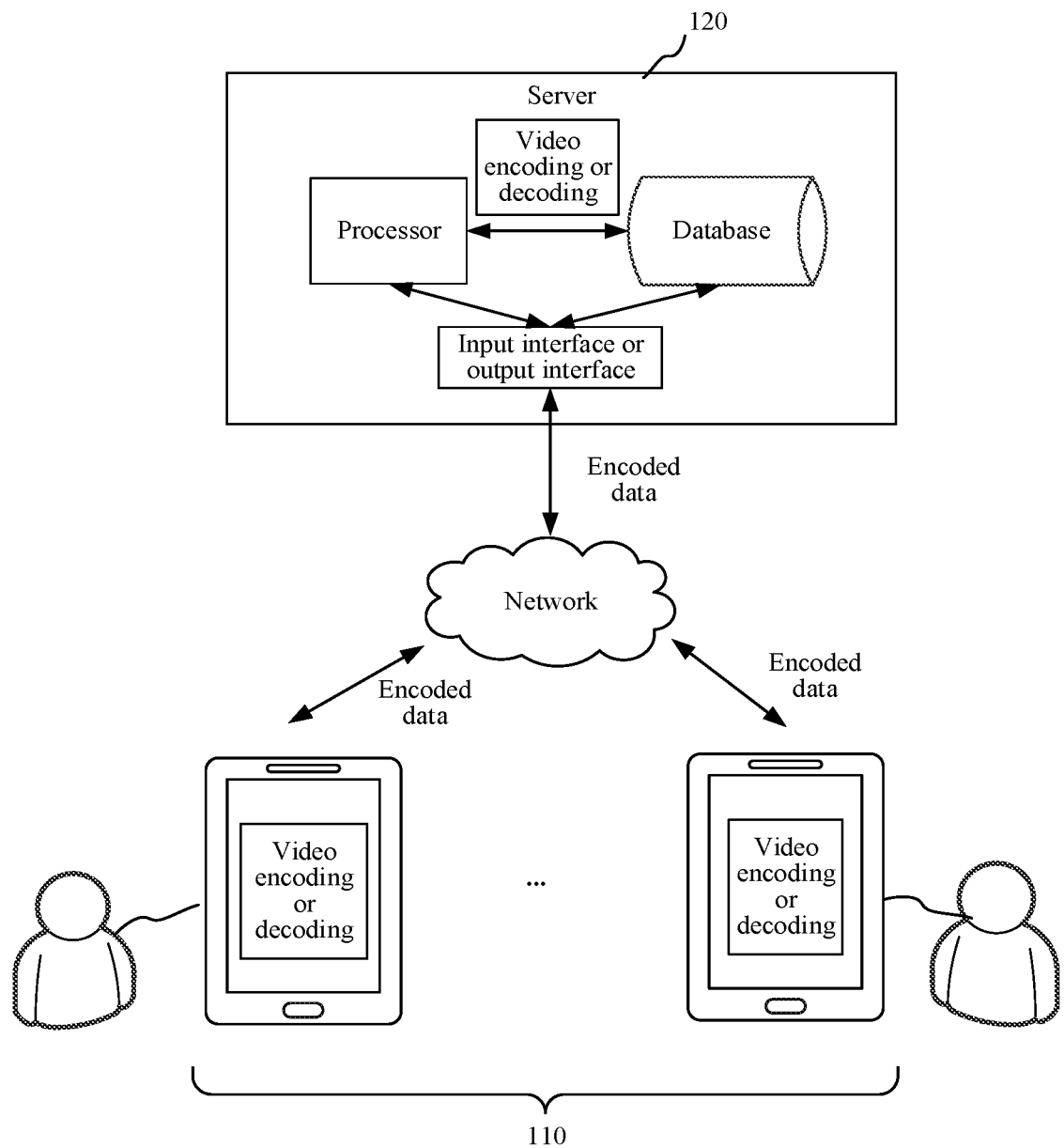
FIG. 1 is a diagram of an application environment of a video encoding method according to an exemplary embodiment of this application.

FIG. 1 is a diagram of an application environment of a video encoding method according to an embodiment. As shown in FIG. 1, in the application environment, a terminal 110 and a server 120 are included.

Optionally, the video encoding method and the video decoding method may be completed in the terminal 110 or the server 120, or may be completed in an interaction scenario of the terminal 110 and the server 120. The terminal 110 or the server 120 may perform video encoding by using an encoder, or perform video decoding by using a decoder. The terminal 110 or the server 120 may alternatively perform video encoding by running a video encoding program through a processor, or perform video decoding by running a video decoding program through a processor. After receiving, through an input interface, encoded data sent by the terminal 110, the server 120 may directly transfer the encoded data to the processor for decoding, or may store the encoded data into a database for subsequent decoding. After obtaining encoded data by encoding an original video frame by using the processor, the server 120 may directly send the encoded data to the terminal 110 through an output interface, or may store the encoded data into a database for subsequent transfer. Certainly, after receiving the encoded data sent by the terminal 110, the server 120 may alternatively send the encoded data to a corresponding receiving terminal, and the receiving terminal decodes the encoded data.

The terminal 110 and the server 120 may be connected through a network. The terminal 110 may be specifically a desktop terminal or a mobile terminal, and the mobile terminal may be specifically at least one of a mobile phone, a tablet computer, a notebook computer, and the like, but is not limited thereto. The server 120 may be implemented by using an independent server or a server cluster that includes a plurality of servers.

Figure 2:
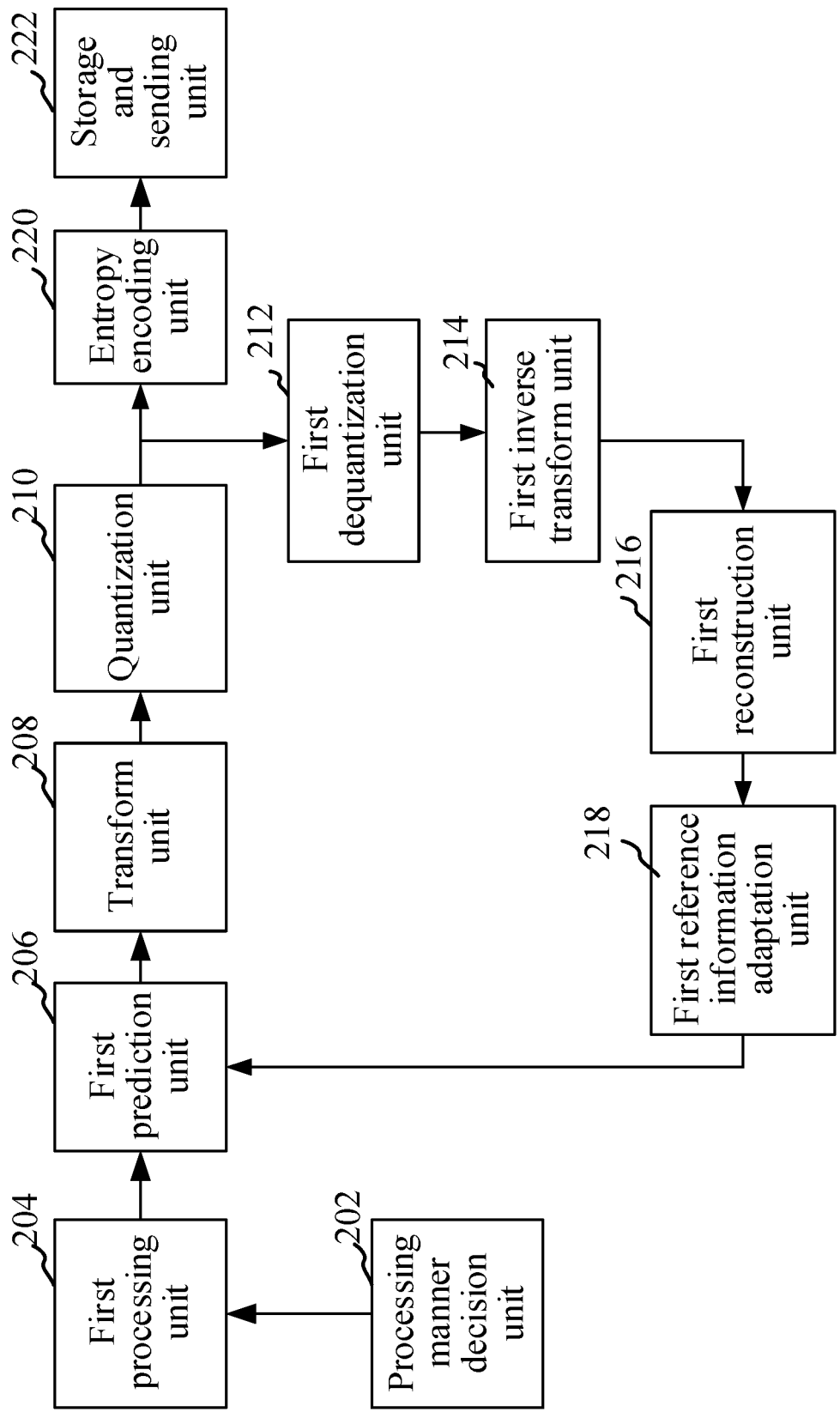
FIG. 2 is a diagram of an encoding framework corresponding to a video encoding method according to an exemplary embodiment of this application.

FIG. 2 is a diagram of an encoding framework corresponding to a video encoding method according to an embodiment. According to the video encoding method provided in this embodiment of this application, each input video frame of an input video sequence may be obtained for encoding, to obtain corresponding encoded data, and the encoded data is stored and/or sent by using a storage sending unit 222. A processing manner decision unit 202 is configured to decide a manner of processing an input video frame, to obtain a processing manner corresponding to the input video frame. A processing unit 204 is configured to correspondingly process the input video frame according to the processing manner, to obtain a current frame. A first prediction unit 206 is configured to perform intra prediction or inter prediction on each code block of the current frame in a resolution of the current frame, obtain a predicted value and a corresponding motion vector according to an image value of a reference block corresponding to the code block, and subtract the predicted value from an actual value of the code block, to obtain a prediction residual, where the motion vector represents displacement of the code block relative to the reference block. A transform unit 208 is configured to: transform a prediction residual and vector information in a spatial domain to a frequency domain, and encode a transform coefficient. Optionally, a method for transforming the prediction residual and the vector information to the frequency domain may be implemented through discrete Fourier transform (DFT), discrete cosine transform (DCT), or the like. The vector information may be a motion vector difference or an actual motion vector representing displacement. The motion vector difference is a difference between the actual motion vector and a predicted motion vector.

Optionally, a quantization unit 210 is configured to map transformed data. For example, the transformed data is divided by a quantization step to obtain a relatively small value as a mapping result of the transformed data. Optionally, the quantization step corresponds to a sequence number, which is used as a quantization parameter of the quantization step, and a corresponding quantization step may be found according to the quantization parameter. Optionally, a smaller quantization parameter indicates more details reserved in an image frame, and a higher corresponding code rate. Correspondingly, a larger quantization parameter indicates a lower corresponding code rate, and fewer details reserved in the image, that is, a more obvious image distortion. A principle of quantization is expressed by using the following formula: FQ=round(y/Qstep). y is a value corresponding to a video frame before quantization is performed, Qstep is a quantization step, and FQ is a quantized value obtained after y is quantized. The Round(x) function is to round off a value to a nearest even number, that is, banker's rounding. Optionally, a correspondence between the quantization parameter and the quantization step may be specifically set according to a requirement. For example, in some video encoding standards, for luminance encoding, the quantization step has a total of 52 values that are integers from 0 to 51. For chrominance encoding, the quantization step has values that are integers from 0 to 39. In addition, the quantization step increases as the quantization parameter increases. Each time the quantization parameter is increased by 6, the quantization step is doubled.

Optionally, an entropy encoding unit 220 is configured to perform entropy encoding. The entropy encoding is a data encoding manner of encoding data according to an entropy principle without losing any information, and through which information can be expressed by using a relatively small character. A method for entropy encoding may be, for example, Shannon encoding or Huffman encoding.

Optionally, a first dequantization unit 212, a first inverse transform unit 214, a first reconstruction unit 216, and a first reference information adaptation unit 218 are units corresponding to a reconstruction path. A reference frame is obtained by reconstructing a frame by using units of the reconstruction path, so that reference frames in encoding and decoding can be kept consistent. A step performed by the first dequantization unit 212 is an inverse process of quantization. A step performed by the first inverse transform unit 214 is an inverse process of transform performed by the transform unit 208. The first reconstruction unit 216 is configured to add residual data obtained through inverse transform to predicted data, to obtain a reconstructed reference frame. The first reference information adaptation unit 218 is configured to perform, in a resolution of a current frame, adaptation on at least one of the following reference information: a current reference frame obtained through reconstruction, location information corresponding to each code block of the current frame, location information corresponding to each reference block in the current reference frame, a motion vector, and the like, so that the first prediction unit 206 performs prediction according to the reference information on which adaptation is performed.

Figure 3:
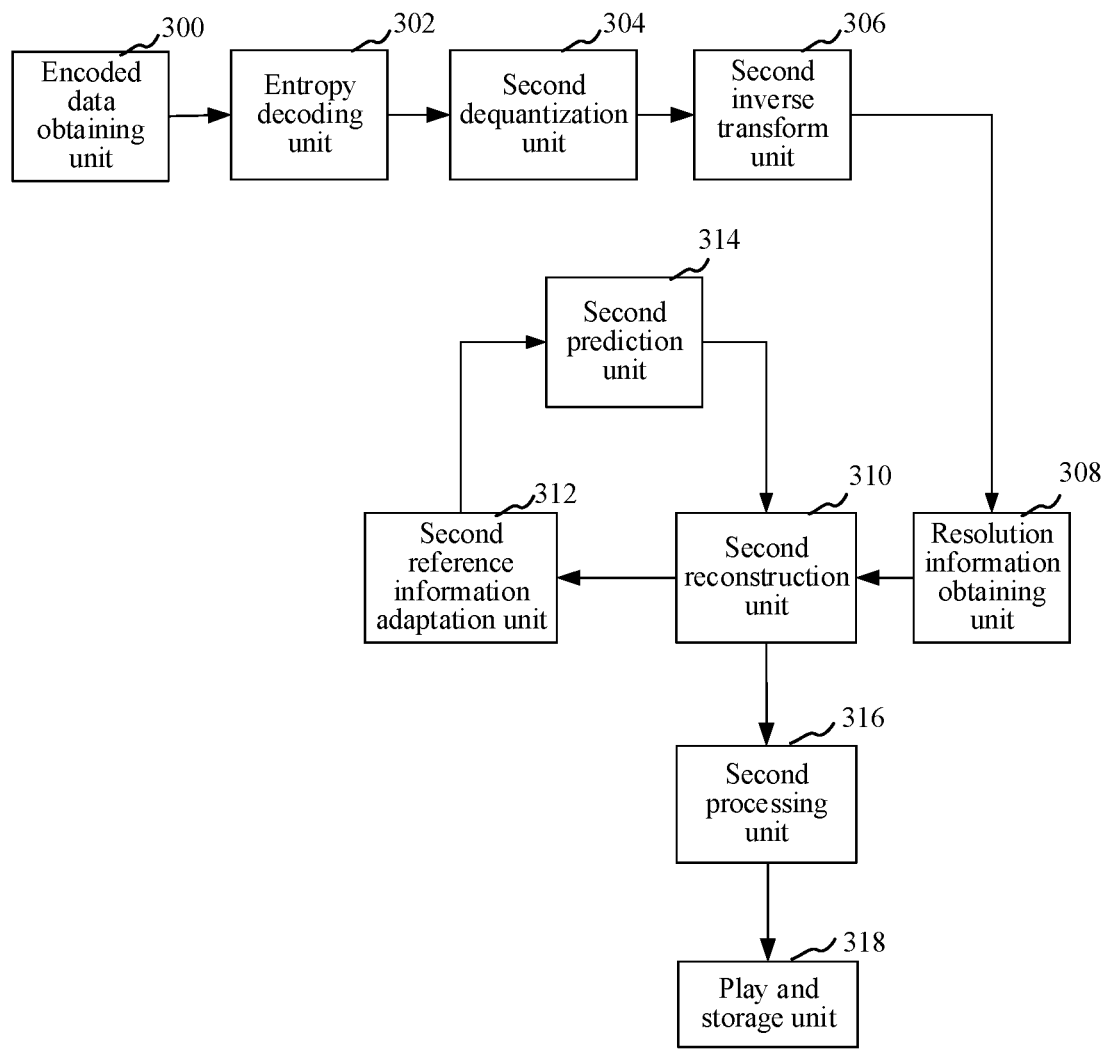
FIG. 3 is a diagram of a decoding framework corresponding to a video decoding method according to an exemplary embodiment of this application.

FIG. 3 is a diagram of a decoding framework corresponding to a video decoding method according to an embodiment. According to the video decoding method provided in this embodiment of this application, encoded data corresponding to each current video frame of a to-be-decoded video sequence may be obtained by an encoded data obtaining unit 300. An entropy decoding unit 302 performs entropy decoding, to obtain entropy decoded data. A second dequantization unit 304 performs dequantization on the entropy decoded data, to obtain dequantized data. A second inverse transform unit 306 performs inverse transform on the dequantized data, to obtain inverse-transformed data. The inverse-transformed data may be consistent with data obtained after inverse transform is performed by the first inverse transform unit 214 in FIG. 2. A resolution information obtaining module 308 is configured to obtain resolution information corresponding to the current video frame. A second reference information adaptation unit 312 is configured to: obtain the current reference frame obtained through reconstruction performed by a second reconstruction unit, and perform, according to the resolution information of the current video frame, adaptation on at least one of the following reference information: the current reference frame, location information corresponding to each current block of the current video frame, location information corresponding to each reference block in the current reference frame, a motion vector, and the like, so that the prediction is performed according to the information on which adaptation is performed. A second prediction unit 314 obtains a reference block corresponding to the current block according to the reference information obtained after adaptation is performed, and obtains a predicted value consistent with the predicted value in FIG. 2 according to an image value of the reference block. A second reconstruction unit 310 performs reconstruction according to the predicted value and the inverse-transformed data, that is, the prediction residual, to obtain a reconstructed video frame. A second processing unit 316 processes the reconstructed video frame according to the resolution information corresponding to the current video frame, to obtain a corresponding decoded video frame. A play and storage unit 318 may play or store the decoded video frame, or play and store the decoded video frame.

It may be understood that the foregoing diagram of an encoding framework diagram and the diagram of a decoding framework are merely an example, and do not constitute a limitation to the encoding method and the decoding method to which the solution of this application is applied. The specific diagram of an encoding framework diagram and the diagram of a decoding framework may include more or fewer units than those shown in the figure, or some units are combined, or different component units are included. For example, loop filtering may also be performed on the reconstructed video frame, to alleviate a blocking effect of a video frame, and improve video quality.

In the embodiments of this application, an end performing encoding is referred to as an encoding end, and an end performing decoding is referred to as a decoding end. The encoding end and the decoding end may be the same end or different ends. The foregoing computer device, such as a terminal or a server, may be an encoding end or a decoding end.

Figure 4:
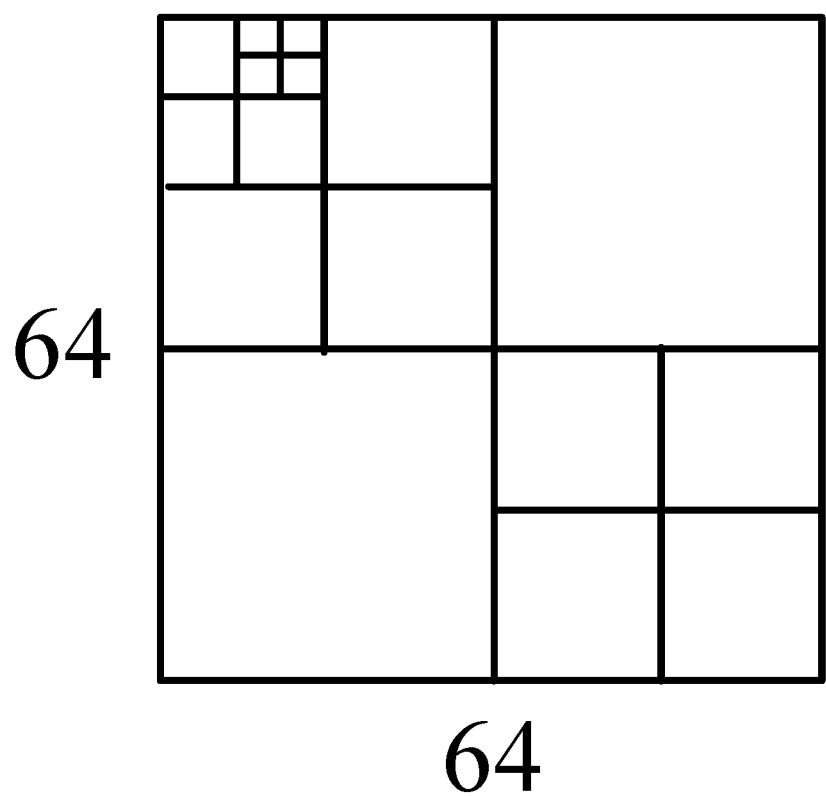
FIG. 4 is a schematic diagram of a code block according to an exemplary embodiment of this application.

A current frame may be divided into a plurality of code blocks, and a size of a code block may be set or calculated according to a requirement. For example, the sizes of the code blocks may all be 8*8 pixels. Alternatively, a dividing manner with a small rate-distortion cost may be selected by calculating rate-distortion costs corresponding to various dividing manners of code blocks, to divide the code blocks. FIG. 4 is a schematic diagram of dividing an image block of 64*64 pixels. One block represents one code block. It can be learned from FIG. 4 that, sizes of code blocks may include 32*32 pixels, 16*16 pixels, 8*8 pixels, and 4*4 pixels. Certainly, the sizes of code blocks may also be other sizes, such as 32*16 pixels or 64*64 pixels. It may be understood that, during decoding, because code blocks are in a one-to-one correspondence to current blocks, sizes of pixels of the current blocks may also include 32*32 pixels, 16*16 pixels, 8*8 pixels, 4*4 pixels, and the like.

In a possible application scenario, the video encoding method and the video decoding method provided in the embodiments of this application may be applied to an application having a video call function. The application may be a social-type application or an instant messaging application. When two terminals installed with the application perform a video call process, a first terminal collects a video frame by using a camera, and then encodes the video frame by using a video encoding function of the application, to obtain encoded data, and sends the encoded data to a background server of the application, and the background server forwards the encoded data to a second terminal. After obtaining the encoded data, the second terminal decodes the encoded data by using a video decoding function of the application, and performs reconstruction to obtain a video frame, to display the video frame. Similarly, the second terminal may send the encoded data obtained through encoding to the first terminal by using the background server, and the first terminal performs decoding and display, to implement a video call between both parties.

In another possible application scenario, the video encoding method and the video decoding method provided in the embodiments of this application may be applied to an application having a video play function. The application may be a video live application, a short video application, or a video play application. A terminal installed with the application may collect a video frame by using a camera, and then encodes the video frame by using a video encoding function of the application, to obtain encoded data, and sends the encoded data to a background server of the application. When another terminal requests to watch the video, the background server sends encoded data of the video to the another terminal, and an application in the another terminal decodes the encoded data, to play the video.

Certainly, the foregoing several possible application scenarios are merely used for illustrative description, and the video encoding method and the video decoding method provided in the embodiments of this application may also be applied to another scenario in which video encoding and video decoding need to be performed. This is not limited in this embodiment of this application.

Figure 5:
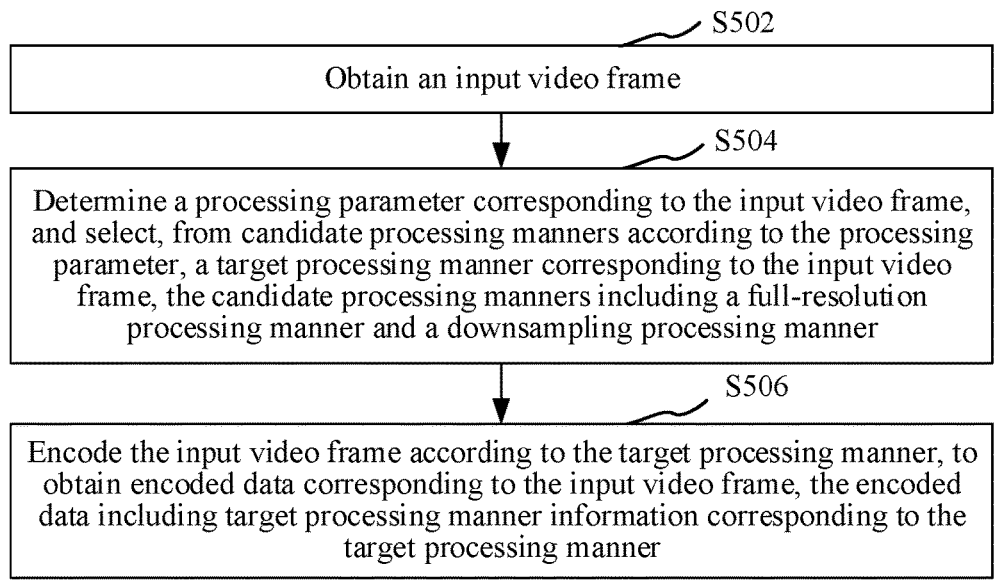
FIG. 5 is a flowchart of a video encoding method according to an exemplary embodiment of this application.

As shown in FIG. 5, in an embodiment, a video encoding method is provided. In this embodiment, description is mainly made by using an example in which the method is applied to the terminal 110 or the server 120 in FIG. 1. The method may specifically include the following steps:

Step S502: Obtain an input video frame.

Optionally, a video frame is a unit that forms a video, and one video sequence may include a plurality of input video frames. The input video frame may be a video frame collected in real time, and may be, for example, a video frame obtained by a computer device in real time by using a camera of a terminal. Alternatively, the may be a video frame corresponding to a pre-stored video sequence. The input video frame may determine a corresponding encoded frame predicted type according to an encoding algorithm. The encoded frame predicted type may be an I frame, a P frame, or a B frame. The I frame is an intra predicted frame, the P frame is a forward predicted frame, the B frame is a bidirectional predicted frame, and code blocks of the P frame and the B frame may be encoded in an intra prediction manner or an inter prediction manner.

Step S504: Determine a processing parameter corresponding to the input video frame, and select, from candidate processing manners according to the processing parameter, a target processing manner corresponding to the input video frame, the candidate processing manners including a full-resolution processing manner and a downsampling processing manner.

Optionally, the target processing manner corresponding to the input video frame may be selected from the candidate processing manners, and the candidate processing manners may include any one of the full-resolution processing manner, and the downsampling processing manner. A method for determining, by the computer device and from the candidate processing manners, the target processing manner corresponding to the input video frame may be set according to an actual requirement. For example, a processing parameter corresponding to the input video frame may be obtained, and the corresponding target processing manner is obtained according to the processing parameter. The processing parameter is a parameter used for determining the processing manner. A specific used processing parameter may be set according to a requirement. For example, the processing parameter may include at least one of current encoding information and an image feature that correspond to the input video frame.

In an embodiment, when the target processing manner corresponding to the input video frame includes the downsampling processing manner, the computer device may further obtain a downsampling proportion and a downsampling method. A sampling proportion is a ratio obtained by dividing a resolution after sampling by a resolution before sampling. The downsampling method may be using a direct average, a filter, bi-cubic-interpolation, bilinear interpolation, or the like. The downsampling proportion may be preset, or may be flexibly adjusted. For example, the downsampling proportions may all be set to 1/2. A downsampling proportion of the first input video frame of the input video sequence may be 1/2, and a downsampling proportion of the second input video frame may be 1/4. The downsampling proportion may be obtained according to an encoding location of the input video frame in a group of pictures (GOP), and a more behind encoding location indicates a smaller downsampling proportion. A downsampling direction may be one of vertical downsampling, horizontal downsampling, and a combination of vertical downsampling and horizontal downsampling. If a resolution of a video frame before sampling is 800*800 pixels, when a downsampling proportion is 1/2 and horizontal downsampling is performed, a resolution of the video frame after sampling is 400*800 pixels. When the downsampling proportion is 1/2 and vertical downsampling is performed, a resolution of the video frame after sampling is 800*400 pixels.

In an embodiment, the downsampling proportion may be obtained according to a processor capability of a device performing the video encoding method, such as a terminal or a server. A device having a strong processor processing capability corresponds to a large downsampling proportion, and a device having a weak processor processing capability corresponds to a small downsampling proportion. A correspondence between the processor processing capability and the downsampling proportion may be set. When encoding needs to be performed, the processor processing capability is obtained, and the corresponding downsampling proportion is obtained according to the processor processing capability. For example, a downsampling proportion corresponding to a 16-bit processor may be set to 1/8, and a downsampling proportion corresponding to a 32-bit processor may be set to 1/4.

In an embodiment, the downsampling proportion may be obtained according to a frequency or a quantity of times that the input video frame is used as a reference frame, and a correspondence between the downsampling proportion and the frequency or the quantity of times that the input video frame is used as the reference frame may be set. A higher frequency or a larger quantity of times that the input video frame is used as the reference frame indicates a larger downsampling proportion. A lower frequency or a smaller quantity of times that the input video frame is used as the reference frame indicates a smaller downsampling proportion. For example, for the I frame, a high frequency that the I frame is used as the reference frame indicates a large corresponding downsampling proportion, which may be 1/2. For the P frame, a low frequency that the P frame is used as the reference frame indicates a small corresponding downsampling proportion, which may be, for example, 1/4. The downsampling proportion is obtained according to the frequency or the quantity of times that the input video frame is used as the reference frame. When the frequency that the is used as the reference frame is high or the quantity of times that the input video frame is used as the reference frame is large, image quality is relatively good, and therefore, prediction accuracy can be improved, a prediction residual can be reduced, and quality of an encoded image can be improved.

In an embodiment, a downsampling method may be obtained according to a processor capability of a device performing the video encoding method, such as a terminal or a server. A downsampling method corresponding to a device having a strong processor processing capability has high complexity, and a downsampling method corresponding to a device having a weak processor processing capability has low complexity. A correspondence between the processor processing capability and the downsampling method may be set. When encoding needs to be performed, a processor processing capability is obtained, and a corresponding downsampling method is obtained according to the processor processing capability. For example, the complexity of bi-cubic interpolation is higher than that of bilinear interpolation. Therefore, a downsampling method corresponding to a 16-bit processor may be set to bilinear interpolation, and a downsampling method corresponding to a 32-bit processor may be set to bi-cubic interpolation.

In this embodiment of this application, when the input video frame is processed in the downsampling processing manner, downsampling may also be performed according to different downsampling methods or downsampling proportions, and a manner of processing the input video frame is more flexible.

In an embodiment, the computer device may obtain the target processing manner corresponding to the input video frame according to at least one type of the current encoding information and image feature information that correspond to the input video frame. The current encoding information is video compression parameter information obtained when a video is encoded, for example, one or more of a frame predicted type, a motion vector, a quantization parameter, a video source, a code rate, a frame rate, and a resolution. The image feature information is information related to image content, and includes one or more of image motion information and image texture information, such as an edge. The current encoding information and the image feature information reflect a scenario, detail complexity, motion intensity, and the like that correspond to a video frame. For example, a motion scenario may be determined through one or more of a motion vector, a quantization parameter, and a code rate. A large quantization parameter generally indicates high motion intensity, and a large motion vector indicates that an image scenario is a large motion scenario.

Optionally, determining may also be performed according to a ratio of a code rate of an encoded I frame to that of an encoded P frame or a ratio of the code rate of the encoded I frame to that of an encoded B frame. When the ratio exceeds a first preset threshold, it is determined that an image is a still image, or when the ratio is less than a second preset threshold, it may be determined that an image is an image with high motion intensity. Alternatively, a target object is directly tracked according to image content, and whether a scenario is a large motion scenario is determined according to a motion speed of the target object. Optionally, a fixed code rate indicates a fixed amount of information that can be expressed. For a scenario with high motion intensity, if an amount of information in a time domain is large, correspondingly, a code rate that can be used for expressing information in a spatial domain is small. Therefore, a relatively good image quality effect can be achieved by using a low resolution, and it is more inclined to select a downsampling manner for encoding. An image switching scenario may be determined according to the frame predicted type, and a preferred processing manner may also be determined according to impact of the frame predicted type on other frames. For example, an I frame is generally the first frame, or image switching exists, and quality of the I frame affects quality of a subsequent P frame or B frame. Therefore, a full-resolution processing manner is more inclined to be selected for an intra predicted frame compared with an inter predicted frame, to ensure image quality. The P frame may be used as the reference frame of the B frame, and image quality of the P frame affects image quality of the subsequent B frame. Therefore, a full-resolution processing manner is more inclined to be selected in encoding by using the P frame compared with encoding by using the B frame. Texture complexity of the current video frame is determined according to the image feature information, for example, image texture information. If a texture is complex and includes a large number of details, there is a large amount of image spatial domain information. If downsampling is performed, a relatively large amount of detail information may be lost due to the downsampling, and video quality is affected. Therefore, a full-resolution processing manner is more inclined to be selected for a current video frame having a complex texture compared with that having a simple texture.

Step S506: Encode the input video frame according to the target processing manner, to obtain the encoded data corresponding to the input video frame.

Optionally, the encoded data includes target processing manner information corresponding to the target processing manner, and the target processing manner information is used for describing a processing manner used for the input video frame. After obtaining the target processing manner, the computer device processes the input video frame according to the target processing manner, to obtain the current frame, encodes the current frame, to obtain encoded data corresponding to the input video frame, and adds the target processing manner information to the encoded data. The current frame is obtained by processing the input video frame according to the target processing manner. When the target processing manner is the full-resolution processing manner, the input video frame may be used as the current frame. When the target processing manner is the downsampling processing manner, downsampling may be performed on the input video frame, to obtain the current frame. For example, when the resolution of the input video frame is 800*800 pixels, and the processing manner is that 1/2 downsampling is performed in both the horizontal direction and the vertical direction, a resolution of the current frame obtained through downsampling is 400*400 pixels.

In an embodiment, the target processing manner information includes a flag bit describing the target processing manner. When the target processing manner is the full-resolution processing manner, a flag bit assigned with a first value is added to frame-level encoding header information corresponding to the input video frame; and when the target processing manner is the downsampling processing manner, a flag bit assigned with a second value is added to the frame-level encoding header information corresponding to the input video frame.

Optionally, the flag bit may be implemented as Frame_Resolution_Flag. To be specific, a flag bit Frame_Resolution_Flag describing the target processing manner may be added to the encoded data, that is, a syntax element describing the processing manner information is added to the encoded data. A value of a flag bit corresponding to each processing manner may be set according to a requirement. For example, when the target processing manner is the full-resolution processing manner, a value of the corresponding Frame_Resolution_Flag may be 0, and when the target processing manner is the downsampling processing manner, the value of the corresponding Frame_Resolution_Flag may be 1.

According to the foregoing video encoding method, during video encoding, the input video frame is obtained, and the target processing manner corresponding to the input video frame is determined from the candidate processing manners, the candidate processing manners including the full-resolution processing manner and the downsampling processing manner, and the input video frame is encoded according to the target processing manner, to obtain the encoded data corresponding to the input video frame, the encoded data including the target processing manner information corresponding to the target processing manner. Therefore, a target processing manner of an input video frame can be flexibly selected, and the input video frame is encoded according to the target processing manner, to adaptively adjust a resolution of the input video frame, and improve video encoding quality under a condition of a limited bandwidth.

In an embodiment, the encoding the input video frame according to the target processing manner, to obtain the encoded data corresponding to the input video frame includes: adding target processing manner information corresponding to the target processing manner to the frame-level encoding header information corresponding to the input video frame.

Figure 6:
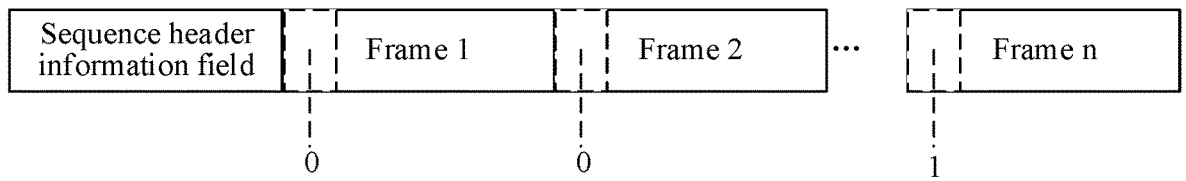
FIG. 6 is a schematic diagram of encoded data according to an exemplary embodiment of this application.

Optionally, the target processing manner information is added to the frame-level header information corresponding to the encoded data, for example, may be added to a preset location of the frame-level header information. The frame-level header information is header information of the encoded data corresponding to the input video frame, sequence-level header information is header information of encoded data corresponding to a video sequence, and group-level header information is header information of encoded data corresponding to a group of pictures (GOP). One video frame sequence may include a plurality of groups of pictures, and one group of pictures may include a plurality of video frames. Blocks drawn by dashed lines in FIG. 6 represent frame-level header information of encoded data corresponding to input video frames. Frames respectively represent encoded data corresponding to the first video frame, the second video frame, and an $n^{th}$ video frame. In FIG. 6, target processing manners corresponding to the first input video frame and the second input video frame are full-resolution processing manners, and a target processing manner corresponding to the $n^{th}$ input video frame is the downsampling processing manner. The target processing manner information is added to the frame-level encoding header information corresponding to the input video frame, so that the corresponding target processing manner information can be quickly obtained from header information corresponding to the video during decoding, and the decoding speed and accuracy of the decoding end are improved.

In an embodiment, the computer device may also add downsampling processing manner information of the downsampling performed on the input video frame to the encoded data corresponding to the input video frame, so that when obtaining the encoded data, the decoding end can obtain, according to the downsampling processing manner information, the corresponding method for downsampling the reconstructed video frame and the downsampling proportion. The downsampling processing manner information includes at least one of downsampling method information and downsampling proportion information. An adding location of the downsampling method information in the encoded data may be one of corresponding group-level header information, sequence-level header information, and frame-level header information. The adding location of the downsampling method information in the encoded data may be determined according to an action range corresponding to the downsampling method. An adding location of the downsampling proportion information in the encoded data may be any one of the corresponding group-level header information, sequence-level header information, and frame-level header information. The adding location of the downsampling proportion information in the encoded data may be determined according to an action range corresponding to the downsampling proportion, and the action range is a scope of application. For example, if the action range of the downsampling proportion is a group of pictures, downsampling proportion information corresponding to the group of pictures may be added to header information corresponding to the group of pictures. If the action range of the downsampling proportion is a video sequence, the downsampling proportion information is added to sequence-level header information corresponding to the video sequence, and this indicates that downsampling is performed on each video frame of the video sequence by using the downsampling proportion corresponding to the downsampling proportion information.

In an embodiment, the target processing manner information corresponding to the target processing manner is added to the encoded data corresponding to the input video frame in a case that the processing parameter cannot be reproduced in a decoding process.

For example, the processing parameter may include at least one of image encoding information and image feature information that correspond to the input video frame. That the processing parameter cannot be reproduced in the decoding process refers to that the processing parameter cannot be obtained or is not generated in the decoding process. For example, the processing parameter may include one or more of data that is not included in encoded data transmitted to the decoding end and data that cannot be deduced and obtained according to the encoded data during decoding. The target processing manner information corresponding to the target processing manner is added to the encoded data corresponding to the input video frame in a case that the processing parameter cannot be reproduced in the decoding process. The processing parameter that cannot be reproduced may include at least one of original image feature information, rate-distortion cost information, and encoded data distortion information that correspond to the input video frame. The original image feature information is video content feature information before the encoding step that causes loss is performed. A loss may occur in image information in the encoding process, that is, a decoded video frame obtained through decoding by the decoding end differs from the input video frame. Therefore, information corresponding to original image content of the input video frame is not obtained in the decoding process, that is, the original image feature information cannot be reproduced in the decoding process. A rate-distortion cost needs to be calculated in the encoding process, and the rate-distortion cost is not calculated in the decoding process. Therefore, when the processing parameter includes the rate-distortion cost, the processing parameter cannot be reproduced in the decoding process. The encoded data distortion information is information related to a distortion degree of the encoded video frame relative to the video frame before encoding is performed. For example, the encoded data distortion information may be mean square error information or peak signal or noise ratio (PSNR) information. The PSNR information of the reconstructed video frame and the input video frame obtained in the encoding process cannot be obtained in the decoding process, therefore the PSNR information cannot be reproduced in the decoding process.

In an embodiment, when the processing parameter can be reproduced in the decoding end, for example, a processing parameter such as a quantity of intra-frame code blocks corresponding to the or a quantity of inter-frame code blocks corresponding to the input video frame can be obtained at the decoding end, the target processing manner information corresponding to the target processing manner may alternatively be added to the encoded data corresponding to the input video frame, or the target processing manner information corresponding to the target processing manner may not be added to the encoded data corresponding to the input video frame. That the processing parameter can be reproduced in the decoding process refers to that the processing parameter can be obtained or generated in the decoding process. For example, the processing parameter may include one or more of data that is included in encoded data transmitted to the decoding end and data that can be deduced and obtained according to the encoded data during decoding. When the target processing manner information corresponding to the target processing manner is added to the encoded data corresponding to the input video frame, the decoding end may read the processing manner information from the encoded data, and does not need to obtain the processing manner according to the processing data. When the target processing manner information corresponding to the target processing manner is not added to the encoded data corresponding to the input video frame, the decoding end determines, according to the processing parameter, a processing manner consistent with that at an encoding end, to reduce a data amount of the encoded data.

Figure 7:
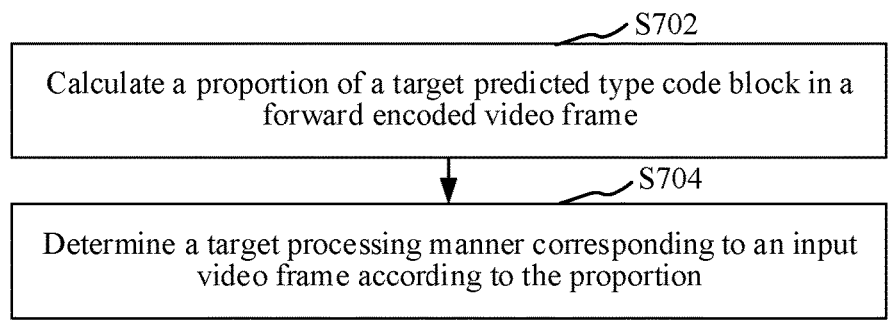
FIG. 7 is a flowchart of obtaining a processing parameter corresponding to an input video frame, and determining, from candidate processing manners according to the processing parameter, a target processing manner corresponding to the input video frame according to an exemplary embodiment of this application.

In an embodiment, as shown in FIG. 7, step S504, that is, determining a processing parameter corresponding to the input video frame, and selecting, from candidate processing manners according to the processing parameter, a target processing manner corresponding to the input video frame includes the following steps:

Step S702: Calculate a proportion of a target predicted type code block in a forward encoded video frame.

Optionally, the predicted type code block is a code block corresponding to a frame predicted type. The proportion of the target predicted type code block may be one or two of a proportion corresponding to an intra-frame code block and a proportion corresponding to an inter-frame code block. The proportion of the target predicted type code block in the forward encoded video frame corresponding to the input video frame may be a ratio of the target predicted type code block to another predicted type code block, or a ratio of a quantity of code blocks of this type to a total quantity of code blocks. This may be specifically set according to a requirement. For example, the computer device may obtain a first quantity of intra-frame code blocks in the forward encoded video frame and a second quantity of inter-frame code blocks in the forward encoded video frame. A ratio of the intra-frame code block to the inter-frame code block is calculated according to the first quantity and the second quantity. Alternatively, a third quantity of all code blocks in the forward encoded video frame is counted, and a ratio of the intra-frame code block to all code blocks is calculated according to the first quantity and the third quantity. A ratio of the inter-frame code block to all code blocks may also be calculated according to the second quantity and the third quantity.

The forward encoded video frame is a video frame that has been encoded before the input video frame is encoded, and a specific quantity of obtained forward encoded video frames may be user-defined. For example, the forward encoded video frame may be one encoded video frame that has been encoded previous to the input video frame, or three encoded video frames that have been encoded previous to the input video frame. When there are a plurality of obtained forward encoded video frames, corresponding proportions of code blocks of different types in each forward encoded video frame may be calculated, and a total proportion is obtained through weighted calculation according to the proportions, and the target processing manner corresponding to the input video frame is then determined according to the total proportion and a preset threshold. A weight corresponding to the forward encoded video frame may be in a negative association with an encoding distance between the forward encoded video frame and the input video frame. For example, there are two forward encoded video frames, a forward encoded video frame A is a video frame that is encoded in a first place, a forward encoded video frame is a video frame that is encoded in a second place, and the input video frame is a video frame that is encoded in a third place. An encoding distance between the input video frame and B is less than an encoding distance between the input video frame and A. Therefore, a weight corresponding to B may be 0.6, and a weight corresponding to A may be 0.4.

Step S704: Determine the target processing manner corresponding to the input video frame according to the proportion.

Optionally, after calculating the corresponding proportion of the target predicted type code block in the forward encoded video frame, the computer device determines the target processing manner corresponding to the input video frame according to the calculated proportion. A proportion of the inter-frame code block of the forward encoded video frame in the forward encoded video frame may be calculated, and when the proportion of the inter-frame code block is less than a specified threshold, the target processing manner is determined as the downsampling processing manner.

In an embodiment, the calculating a proportion of a target predicted type code block in a forward encoded video frame includes: calculating a proportion of an intra-frame code block of the forward encoded video frame in the forward encoded video frame; and the determining the target processing manner corresponding to the input video frame according to the proportion and from the candidate processing manners includes: determining that the target processing manner is the downsampling processing manner in a case that the proportion is greater than a target threshold.

Optionally, for the proportion corresponding to the intra-frame code block, when the proportion is greater than the target threshold, the target processing manner corresponding to the input video frame may be determined as the downsampling processing manner, and otherwise, the target processing manner corresponding to the video frame is determined as the full-resolution processing manner. For example, when the proportion is greater than 0.5, the target processing manner corresponding to the input video frame is determined as the downsampling processing manner, and otherwise, the target processing manner corresponding to the video frame is determined as the full-resolution processing manner. The size of the target threshold may be set according to experience or a requirement, and for example, may be 0.65. In this embodiment of this application, a larger proportion of the intra-frame code block indicates higher complexity of the input video frame or lower correlation between video frames. Therefore, the obtained prediction residual is relatively large. As a result, the downsampling processing manner is more inclined to be used for encoding, to reduce the amount of the encoded data.

In an embodiment, the target threshold is obtained according to resolution information corresponding to a reference frame corresponding to the input video frame. The video encoding method may further include: obtaining a processing manner corresponding to the reference frame corresponding to the input video frame, and determining the target threshold according to the processing manner corresponding to the reference frame.

Optionally, the target threshold may be determined according to a processing manner of the current reference frame corresponding to the input video frame. When the processing manner of the corresponding current reference frame is the downsampling manner, a preset threshold T1 is obtained, and the preset threshold T1 is used as a target threshold. Similarly, when the processing manner of the current reference frame is the full-resolution processing manner, a preset threshold T2 is obtained, and the preset threshold T2 is used as a target threshold. Further, after the target threshold is obtained according to the processing manner of the reference frame corresponding to the input video frame, the target processing manner of the input video frame is determined according to the target threshold and the proportion of the intra-frame code block of the forward encoded video frame in the forward encoded video frame. When the proportion of the intra-frame code block of the forward encoded video frame in the forward encoded video frame is greater than the target threshold, the target determining manner corresponding to the input video frame is determined as the downsampling processing manner.

In an embodiment, the preset threshold T2 is greater than the preset threshold T1, so that when the processing manner corresponding to the current reference frame is the full-resolution processing manner, the full-resolution processing manner is more inclined to be used for the input video frame, and when the processing manner corresponding to the current reference frame is the downsampling processing manner, the downsampling processing manner is more inclined to be used for the input video frame.

Figure 8:
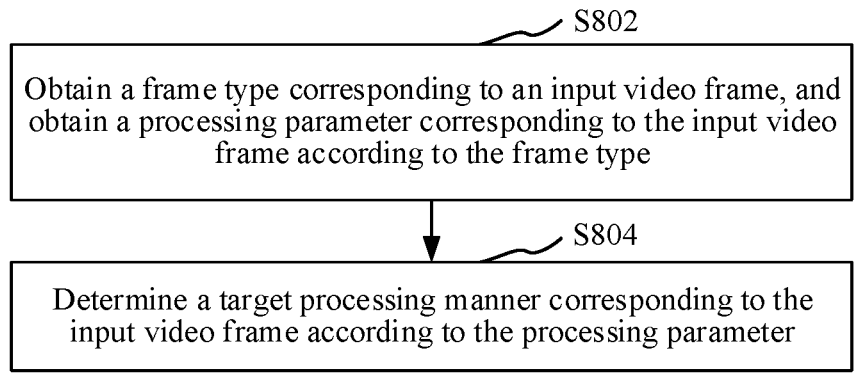
FIG. 8 is a flowchart of obtaining a processing parameter corresponding to an input video frame, and determining, from candidate processing manners according to the processing parameter, a target processing manner corresponding to the input video frame according to an exemplary embodiment of this application.

In an embodiment, as shown in FIG. 8, step S504, that is, determining a processing parameter corresponding to the input video frame, and selecting, from candidate processing manners according to the processing parameter, a target processing manner corresponding to the input video frame includes the following steps:

Step S802: Obtain a frame type corresponding to the input video frame, and obtain a processing parameter corresponding to the input video frame according to the frame type.

Optionally, the frame type is a predicted type of the video frame. The frame predicted type may be an I frame, a P frame, or a B frame. The I frame is an intra predicted frame, the P frame is a forward predicted frame, the B frame is a bidirectional predicted frame, and code blocks of the P frame and the B frame may be encoded in an intra prediction manner or an inter prediction manner. A correspondence between the frame predicted type and the processing parameter may be set. When the frame type corresponding to the input video frame is obtained, the processing parameter corresponding to the input video frame is obtained according to the correspondence between the frame predicted type and the processing parameter. A least one of processing types and parameter values of processing parameters corresponding to different frame types differ.

In an embodiment, the computer device may set a specific value of a corresponding processing parameter according to a frequency or a quantity of times that the input video frame is used as a reference frame. A higher frequency or a larger quantity of times that the input video frame is used as the reference frame indicates a higher possibility that the target processing manner obtained according to the corresponding processing parameter is the full-resolution processing manner. For example, for the I frame, if the frequency that the I frame is used as the reference frame is high, when the processing parameter includes a current quantization parameter and a quantization parameter threshold, and when a rule of determining the processing manner is: if the current quantization parameter is greater than the quantization parameter threshold, determining the processing manner as the downsampling manner, and otherwise, determining the processing manner as the full-resolution processing manner; the quantization parameter threshold corresponding to the I frame is less than that corresponding to the P frame and the B frame, so that the possibility that the target processing manner corresponding to the I frame is the full-resolution processing manner is greater than the possibility that the target processing manner corresponding to the P frame and the B frame is the full-resolution processing manner.

In an embodiment, for the P frame and the B frame, the computer device may obtain the corresponding target processing manner according to a proportion of the intra-frame code block in the forward encoded video frame thereof. For the I frame, because the I frame is an intra-frame encoding predicted type, reference meaning of the proportion of the intra-frame code block in the forward encoded video frame thereof is insignificant for determining the processing manner. Even if the proportion of the intra-frame code block in the forward encoded video frame thereof is large, when the correlation of the intra-frame code block is large, encoded data corresponding to the I frame is relatively small. Therefore, the effect of performing encoding after the I frame is downsampled is not greatly improved compared with the effect of directly performing encoding in a full resolution. Therefore, for the I frame, the corresponding target processing manner may be determined according to image feature information of the I frame. For example, if it is determined, according to image content of the I frame, that the I frame corresponds to a scenario with high motion intensity, an amount of information in a time field corresponding to the I frame is large, and correspondingly, a code rate that can be used for expressing information in a spatial field is small. Therefore, a relatively good image quality effect can be achieved by using a low resolution, and it is more inclined to select the downsampling processing manner as the target processing manner corresponding to the I frame.

Step S804: Determine the target processing manner corresponding to the input video frame according to the processing parameter.

Optionally, target processing manner determining methods corresponding to different frame types may be different or the same. For example, if parameter types of processing parameters corresponding to different frame types are the same, and specific values of the processing parameters are different, the same processing manner determining manner may be used for determining the corresponding target processing manner. If parameter types of processing parameters corresponding to different frame types are different, different processing manner determining methods may be used. After the processing parameter is obtained, the target processing manner is determined from the candidate processing manners according to the processing parameter. For the method for determining the target processing manner according to the processing parameter, refer to the determining manner determining method in the foregoing embodiment, and details are not described herein again in this embodiment of this application. In this embodiment of this application, the target processing manner may be flexibly determined according to the predicted type of the input video frame by setting the correspondence between the frame type and the processing parameter, to improve encoding quality.

In an embodiment, the determining, from candidate processing manners, a target processing manner corresponding to the input video frame includes: obtaining a current quantization parameter corresponding to the input video frame; obtaining a quantization parameter threshold corresponding to the input video frame; and determining the target processing manner corresponding to the input video frame according to a size relationship between the current quantization parameter and the quantization parameter threshold.

Optionally, if the current quantization parameter is greater than the quantization parameter threshold, the computer device determines the target processing manner as the downsampling manner, and otherwise, determines the target processing manner as the full-resolution processing manner. The quantization parameter threshold may be obtained according to a proportion of an intra-frame code block of an encoded forward encoded video frame before the input video frame, and a correspondence between the proportion of an intra predicted block and the quantization parameter threshold may be set, so that the computer device may determine a quantization parameter threshold corresponding to a proportion of an intra predicted block of a current frame according to the correspondence after determining the proportion of the intra predicted block of the current frame. For fixed quantization parameter encoding, the current quantization parameter may be a corresponding fixed quantization parameter value. For fixed code rate encoding, a current quantization parameter corresponding to the input video frame may be calculated according to a code rate control model. Alternatively, the quantization parameter corresponding to the reference frame may be used as a current quantization parameter corresponding to the input video frame. In this embodiment of this application, a larger current quantization parameter usually indicates higher motion intensity, and the downsampling processing manner is more inclined to be selected for a scenario having high motion intensity.

Figure 9:
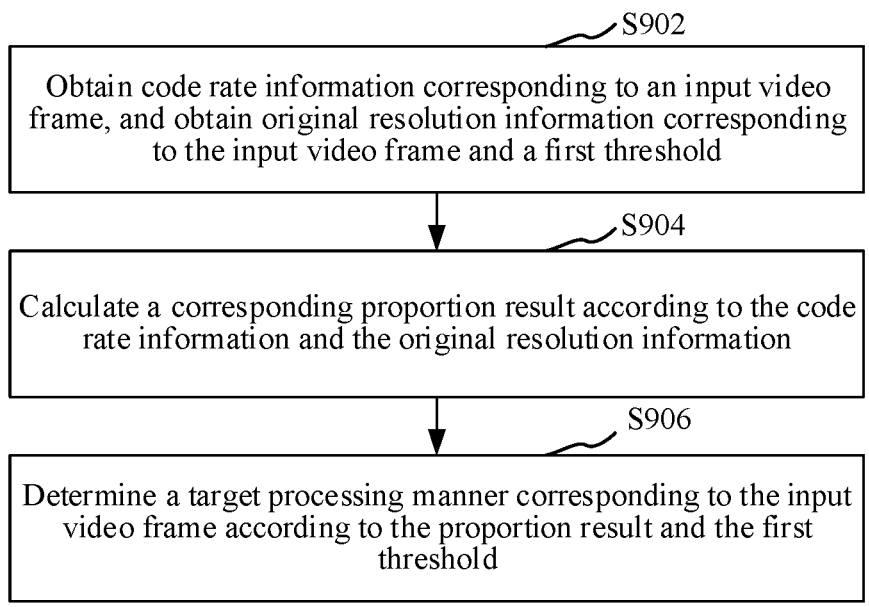
FIG. 9 is a flowchart of obtaining a processing parameter corresponding to an input video frame, and determining, from candidate processing manners according to the processing parameter, a target processing manner corresponding to the input video frame according to an exemplary embodiment of this application.

In an embodiment, a relationship between the proportion of the intra predicted block and the quantization parameter threshold is a positive correlation. For example, according to experience, a correspondence between the proportion Intra( ) of the intra predicted block and the quantization parameter threshold QPTH may be predetermined as:

In an embodiment, as shown in FIG. 9, step S504, that is, determining a processing parameter corresponding to the input video frame, and selecting, from candidate processing manners according to the processing parameter, a target processing manner corresponding to the input video frame includes the following steps:

Step S902: Obtain code rate information corresponding to the input video frame, and obtain original resolution information corresponding to the input video frame and a first threshold.

The code rate information is information related to a code rate, and the code rate information is an important factor determining video picture quality. The code rate information includes but is not limited to a target code rate and the like. The original resolution information is information related to a resolution corresponding to an original image, and for example, may be information calculated according to a width and a height of the original resolution. Optionally, the code rate information corresponding to the input video frame is obtained, and then the corresponding original resolution information and a preset first threshold are obtained according to the input video frame. The first threshold is used for comparison with the original resolution information, to obtain the target manner corresponding to the input video frame, and the first threshold may be set according to an actual requirement.

Step S904: Calculate a corresponding proportion result according to the code rate information and the original resolution information.

Step S906: Determine the target processing manner corresponding to the input video frame according to the proportion result and the first threshold.

Optionally, after obtaining the code rate information corresponding to the input video frame, the corresponding original resolution information and the first threshold, the computer device calculates a corresponding proportion result according to the code rate information and the original resolution information, and specifically, the calculation may be but is not limited to using a ratio of the code rate information to the original resolution information as the corresponding proportion result. For example, when the obtained code rate information corresponding to the input video frame is a target code rate, and the original resolution information is a product of a width and a height of the original resolution, a corresponding proportion result k calculated according to the code rate information and the original resolution information is: target code rate/width*height of original resolution.

Further, the processing manner is selected from the candidate processing manners, and the candidate processing manners include the full-resolution processing manner and the downsampling processing manner. Optionally, after the corresponding proportion result is calculated according to the code rate information and the original resolution information, the target processing manner corresponding to the input video frame is determined according to the proportion result and the obtained first threshold. When the target code rate corresponding to the input video frame is less than the preset threshold, a quantity of bits assigned to the input video frame is small. If encoding is performed according to the original resolution, quality of a decoded image is low. However, if encoding is performed by using a downsampling resolution, a downsampling resolution encoded image with high quality can be obtained. Therefore, when a code rate is relatively low, a downsampling resolution frame with relatively high quality is selected to be encoded. Therefore, when the proportion result is less than the obtained first threshold, the target processing manner corresponding to the input video frame is determined as the downsampling processing manner, and otherwise, the target processing manner corresponding to the input video frame is determined as the full-resolution processing manner.

In an embodiment, step S506, that is, the encoding the input video frame according to the target processing manner, to obtain the encoded data corresponding to the input video frame includes: processing the input video frame according to the target processing manner, to obtain a current frame; and encoding the current frame in a resolution of the current frame, to obtain encoded data corresponding to the input video frame.

Optionally, encoding may include at least one of prediction, transform, quantization, and entropy encoding. When the current frame is an I frame, intra prediction is performed on the current frame in a resolution of the current frame. When the current frame is a P frame or a B frame, a current reference frame corresponding to the current frame may be obtained, and prediction is performed according to the current reference frame, to obtain a prediction residual, and transform, quantization, and entropy encoding are performed on the prediction residual, to obtain the encoded data corresponding to the input video frame. In a process of obtaining the encoded data, at least one of a current reference frame, location information corresponding to each code block of the current frame, location information corresponding to each reference block in the current reference frame, and a motion vector is processed according to the resolution of the current frame. For example, during calculation of the prediction residual, the current reference frame may be processed according to the resolution information of the current frame, to obtain the target reference frame, and a target reference block corresponding to each code block in the current frame is obtained from the target reference frame, and prediction is performed according to the target reference block, to obtain a predicted value corresponding to the code block, and then the prediction residual is obtained according to a difference between an actual value of the code block and the predicted value. During calculation of the target motion vector, if the resolution of the current reference frame is different from the resolution of the current frame, location information of the code block or location information of a decoding block may be transformed according to the resolution information of the current reference frame and the resolution information of the current frame, so that the location information corresponding to the current frame and the location information of the current reference frame are in a same quantization scale, and then the target motion vector is obtained according to the transformed location information, to reduce a value of the target motion vector, and reduce a data amount of the encoded data.

Alternatively, if the resolution information corresponding to the target motion vector is different from the resolution information of the current frame, when the first motion vector corresponding to a code block of the current frame is calculated in a resolution corresponding to the current frame, the first motion vector is transformed according to the resolution information of the current frame and the target motion vector unit resolution information, to obtain the target motion vector in a target resolution. For example, it is assumed that the resolution of the current frame is 400*800 pixels, and the resolution of the current reference frame is 800*1600 pixels. Then, 1/2 downsampling may be performed on the current reference frame according to the resolution of the current frame, to obtain that the resolution of the target reference frame is 400*800 pixels, and then video encoding is performed according to the target reference frame.

In this embodiment of this application, after the target processing manner corresponding to the input video frame is obtained, the input video frame may be processed according to the target processing manner, to obtain the current frame. The resolution of the current frame corresponding to the processing manner is the resolution of the input video frame or is less than the resolution of the input video frame, and in the resolution of the current frame, the current frame is encoded to obtain the encoded data corresponding to the input video frame. A processing manner of the video frame can be flexibly selected, to process the input video frame and adaptively adjust the resolution of the input video frame, so that video encoding quality is improved under a condition of a limited bandwidth. In addition, encoding is performed in the resolution of the current frame, so that accurate encoded data can be obtained.

Figure 10:
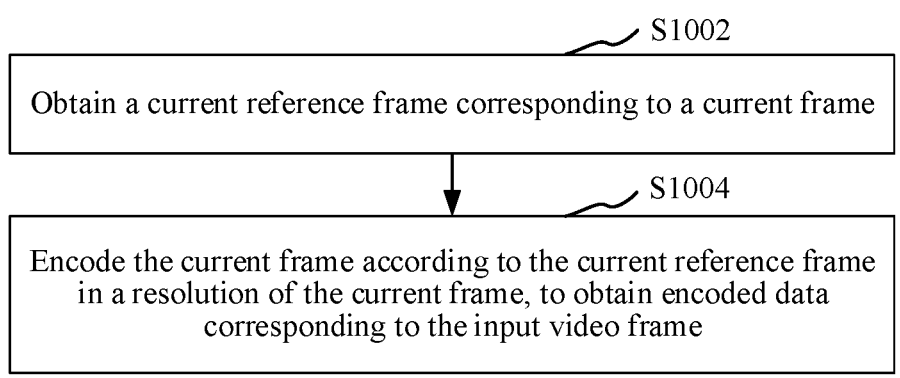
FIG. 10 is a flowchart of encoding a current frame in a resolution of the current frame, to obtain encoded data corresponding to an input video frame according to an exemplary embodiment of this application.

In an embodiment, as shown in FIG. 10, the encoding the current frame in a resolution corresponding to the current frame, to obtain encoded data corresponding to the input video frame includes the following steps:

Step S1002: Obtain a current reference frame corresponding to the current frame.

Optionally, the current reference frame is a video frame that needs to be referred to when the current frame is encoded, and the current reference frame is a video frame obtained by reconstructing data that has been obtained through encoding before the current frame. There may be one or more current reference frames corresponding to the current frame. For example, when the current frame is a P frame, there may be one corresponding reference frame. When the current frame is a B frame, there may be two corresponding reference frames. A reference frame corresponding to the current frame may be obtained according to a reference relationship, and the reference relationship is determined according to each video encoding and decoding standard. For example, when the second video frame in a GOP is a B frame, a corresponding reference frame may be a video frame obtained after an I frame of the group of pictures and the fourth frame of the group of pictures are correspondingly encoded, and then decoding and reconstruction are performed on the encoded frames.

In an embodiment, the obtaining a current reference frame corresponding to the current frame includes: obtaining a first reference rule, the first reference rule including a size relationship between a resolution of the current frame and a resolution of the current reference frame; and obtaining the current reference frame corresponding to the current frame according to the first reference rule.

Optionally, the first reference rule determines the size relationship between the resolution of the current frame and the resolution of the current reference frame, and the size relationship between the resolutions includes at least one of that the resolution of the current frame is the same as the resolution of the current reference frame and that the resolution of the current frame is different from the resolution of the current reference frame. When the first reference rule includes that the resolution of the current frame is the same as the resolution of the current reference frame, the first reference rule may further include a processing manner reference rule of the resolution of the current frame and the current reference frame. For example, the processing manner reference rule may include one or two of the following: a current frame with a full-resolution processing manner may refer to a reference frame with a full-resolution processing manner, and a current frame with a downsampling processing manner may refer to a reference frame with a downsampling processing manner. When the first reference rule includes that the resolution of the current frame is different from the resolution of the reference frame, the first reference rule may further include one or two of that the resolution of the current frame is greater than the resolution of the reference frame and the resolution of the current frame is less than the resolution of the reference frame. Therefore, in an embodiment, the first reference rule may specifically include one or more of the following: a current frame with an original resolution may refer to a reference frame with a downsampling resolution, a current frame with a downsampling resolution may refer to a reference frame with an original resolution, a current frame with an original resolution may refer to a reference frame with an original resolution, and a current frame with a downsampling resolution may refer to a reference frame with a downsampling resolution. The current frame with an original resolution refers to that the resolution of the current frame is the same as the resolution of the input video frame corresponding to the current frame, and the reference frame with an original resolution refers to that the resolution of the reference frame is the same as the resolution of the input video frame corresponding to the reference frame. The current frame with a downsampling resolution refers to that the current frame is obtained by downsampling the corresponding input video frame. The reference frame with a downsampling resolution refers to that the reference frame is obtained by downsampling the corresponding input video frame. After the first reference rule is obtained, the current reference frame corresponding to the current frame is obtained according to the first reference rule, so that the obtained current reference frame meets the first reference rule.

In an embodiment, the encoding the current frame in a resolution corresponding to the current frame, to obtain encoded data corresponding to the input video frame includes: adding rule information corresponding to the first reference rule to the encoded data corresponding to the input video frame.

Optionally, the rule information is used for describing a used reference rule, and the computer device may add a flag bit Resolution_Referencer_Rules, which describes the reference rule, to the encoded data. A reference rule represented by a specific value of the flag bit may be set according to a requirement. An adding location of the rule information in the encoded data may be one or more of group-level header information, sequence-level header information, and frame-level header information. The adding location of the rule information in the encoded data may be determined according to an action range of the first reference rule. When the first reference rule is that a current frame with an original resolution may refer to a reference frame with a downsampling resolution, the corresponding Resolution_Referencer_Rules may be 1. When the first reference rule is that a current frame with a downsampling resolution may refer to a reference frame with a downsampling resolution, the corresponding Resolution_Referencer_Rules may be 2. If the video sequence uses the same first reference rule, the adding location of the rule information in the encoded data may be the sequence-level header information. If the first reference rule is a reference rule used by one group of pictures therein, the adding information of the rule information in the encoded data is group-level header information corresponding to the group of pictures that uses the first reference rule.

Step S1004: Encode the current frame according to the current reference frame in the resolution of the current frame, to obtain the encoded data corresponding to the input video frame.

Optionally, the computer device may obtain a current reference frame corresponding to the current frame, perform prediction according to the current reference frame, to obtain a prediction residual, and perform transform, quantization, and entropy encoding on the prediction residual, to obtain the encoded data corresponding to the input video frame. After obtaining the current reference frame, the computer device may obtain, from the current reference frame, a reference block corresponding to a code block of the current frame, and encode the code block according to the reference block. The computer device may alternatively process the current reference frame according to the resolution of the current frame, to obtain a corresponding target reference frame, obtain, from the target reference frame, a target reference block corresponding to the code block of the current frame, and encode the code block according to the target reference block, to obtain the encoded data corresponding to the input video frame.

In an embodiment, the encoding the current frame in the resolution of the current frame, to obtain encoded data corresponding to the input video frame includes: obtaining a corresponding encoding manner during the encoding the current frame in the resolution of the current frame; and adding encoding manner information corresponding to the encoding manner to the encoded data corresponding to the input video frame.

Optionally, the encoding manner is a processing manner related to encoding. For example, the encoding manner may include one or more of an upsampling manner used for a video frame obtained after decoding and reconstruction are performed on a reference frame during encoding, a rule corresponding to a reference rule, a sampling manner for sampling the reference frame, and a resolution corresponding to a motion vector. The encoding manner information corresponding to the encoding manner is added to the encoded data corresponding to the input video frame, so that the encoded data corresponding to the current video frame can be decoded according to the encoding manner information during decoding.

In an embodiment, the computer device may alternatively not add the encoding manner information corresponding to the encoding manner to the encoded data. Instead, an encoding manner is preset in an encoding and decoding standard, and a decoding manner corresponding to the encoding manner is set in a decoding end. Alternatively, the encoding end and the decoding end may calculate a matching encoding manner and decoding manner according to same or corresponding algorithms. For example, in the encoding and decoding standard, it is preset that the method for upsampling the current reference frame during encoding is the same as the method for upsampling the current reference frame during decoding.

Figures 11, 12, 13:
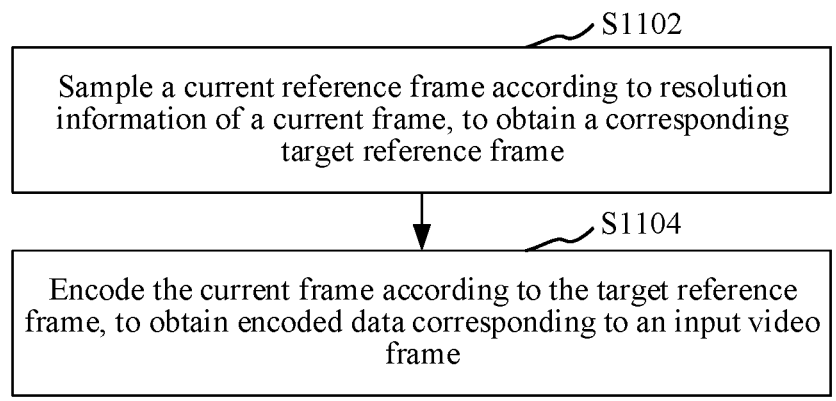
FIG. 11 is a flowchart of encoding a current frame according to a current reference frame, to obtain encoded data corresponding to an input video frame according to an exemplary embodiment of this application.
FIG. 12 is a schematic diagram of performing interpolation on a current reference frame according to an exemplary embodiment of this application.
FIG. 13 is a schematic diagram of performing interpolation on a current reference frame according to an exemplary embodiment of this application.

In an embodiment, as shown in FIG. 11, the encoding the current frame according to the current reference frame, to obtain the encoded data corresponding to the input video frame includes the following steps:

Step S1102: Sample the current reference frame according to the resolution information of the current frame, to obtain a corresponding target reference frame.

Optionally, the target reference frame is a video frame obtained after the current reference frame is sampled. The sampling is a process of sampling the current reference frame according to the resolution information of the current frame, to make resolution information of the obtained target reference frame match. During sampling, a sampling manner may be first determined, and the sampling manner includes one of a direct subpixel interpolation manner and a subpixel interpolation manner after sampling. In the direct subpixel interpolation manner, subpixel interpolation is directly performed on the current reference frame, and in the subpixel interpolation manner after sampling, subpixel interpolation is performed on the current reference frame after the current reference frame is sampled.

Subpixel interpolation is a process of obtaining reference data of a subpixel level by performing interpolation on reference data of an integer pixel in the current reference frame. For example, FIG. 12 and FIG. 13 are schematic diagrams of performing interpolation on a current reference frame according to an embodiment. Referring to FIG. 12, pixels such as A1, A2, A3, B1, B2, and B3 are 2*2 integer pixels in the current reference frame, and reference data of a subpixel is calculated by averaging reference data of the integer pixels. For example, reference data of a subpixel a23 may be calculated by averaging reference data of three integer pixels, namely, A1, A2, and A3, and then reference data of a subpixel a21 is calculated by averaging reference data of three integer pixels, namely, A2, B2, and C2, and then reference data of a subpixel a22 is calculated according to the reference data of the subpixels a23 and a21, to implement 1/2 pixel precision interpolation on the current reference frame. Referring to FIG. 13, pixels such as A1, A2, A3, B1, B2, and B3 are 4*4 integer pixels in the current reference frame, and reference data of 15 subpixels is obtained through calculation according to the reference data of the integer pixels, to implement 1/4 pixel precision interpolation on the current reference frame. For example, reference data of a subpixel a8 is obtained through calculation according to reference data of the integer pixels, that is, A2 and B2, reference data of a subpixel a2 is obtained through calculation according to reference data of the integer pixels, that is, A2 and A3, and similarly, reference data of a total of 15 subpixels, that is, a1 to a15, is obtained through calculation, to implement 1/4 pixel precision interpolation on the integer pixel A2. In a process of encoding the current frame, a reference block corresponding to a code block in the current frame needs to be found in the current reference frame by using a motion search technology, and a motion vector is obtained through calculation according to motion information of the code block relative to the reference block, and the motion vector is encoded to notify the decoding end of the location of the reference data corresponding to the reference block in the current reference frame. Therefore, subpixel interpolation is performed on the current reference frame, to obtain the target reference frame, and motion estimation may be performed on the current frame according to the target reference frame with a higher solution, to improve accuracy of motion estimation, and improve encoding quality.

In an embodiment, the encoding end and the decoding end may set, in respective encoding and decoding rules, sampling manners adopted when the target reference frame is obtained by processing the current reference frame, and the adopted sampling manners are consistent. A sampling manner corresponding to processing the current reference frame is determined according to configuration during encoding and decoding.

In an embodiment, the encoding the current frame in the resolution of the current frame, to obtain encoded data corresponding to the input video frame includes: adding sampling manner information corresponding to the sampling performed on the current reference frame to the encoded data corresponding to the current reference frame. An adding location that is of the sampling manner information corresponding to sampling the current reference frame and that is in the encoded data may be any one of corresponding sequence-level header information, group-level header information, and frame-level header information. The adding location of the sampling manner information in the encoded data may be determined according to an action range corresponding to the sampling manner. The computer device may add the sampling manner information to the frame-level header information of the encoded data corresponding to the input video frame, and this indicates that when the input video frame is encoded, subpixel interpolation is performed on the corresponding current reference frame in a sampling manner corresponding to the sampling manner information. For example, when a flag bit Pixel_Sourse_Interpolation used for determining the sampling manner in the frame-level header information of the encoded data is 0, it indicates that the direct subpixel interpolation is performed on the current reference frame corresponding to the input video frame; and when Pixel_Sourse_Interpolation is 1, it indicates that input video frame subpixel interpolation is performed on the current reference frame corresponding to the after sampling. The decoding end may perform subpixel interpolation on the current reference frame according to the subpixel interpolation manner represented by the flag bit in the encoded data, to obtain the target reference frame, so that the encoded data may be decoded according to the target reference frame, to obtain the reconstructed video frame.

In an embodiment, a sampling proportion of the current reference frame may be determined according to a proportional relationship between the resolution of the current frame and the resolution of the current reference frame. For example, resolutions of input video frames are all 2M*2N, and if the current input video frame is processed according to a full-resolution processing manner, that is, the current input video frame is directly used as a current frame, the resolution of the current frame is 2M*2N. If the input video frame that can be used as a reference frame is processed according to a downsampling processing manner, to obtain that the resolution of the current to-be-encoded reference frame after downsampling is M*2N, the resolution of the corresponding current reference frame obtained after reconstruction is also M*2N. In this case, it is determined to perform downsampling on the current reference frame in a sampling proportion that a width is 2 and a height is 1, to obtain a frame with a resolution the same as that of the current frame. If the current input video frame is processed according to the downsampling processing manner, the resolution of the current frame obtained after downsampling is M*N. If the input video frame that can be used as a reference frame is processed according to a full-resolution processing manner, and the resolution of the current reference frame obtained after reconstruction is 2M*2N, it is determined to perform downsampling on the current reference frame in a sampling proportion that a width and a height are both 1/2, to obtain a frame with a resolution the same as that of the current frame.

In an embodiment, because the resolutions of input video frames are generally the same, a downsampling proportion corresponding to the current frame may be obtained by downsampling the input video frame, and a downsampling proportion corresponding to the to-be-encoded reference frame is obtained by downsampling the input video frame that can be used as a reference frame, to obtain a sampling proportion of the current reference frame. For example, if the current frame is obtained by downsampling the input video frame in a sampling proportion of 1/2, and the to-be-encoded reference frame is obtained by downsampling the input video frame that can be used as a reference frame in a sampling proportion of 1/4, a downsampling proportion corresponding to the current reference frame obtained after reconstruction is performed according to the encoded data of the to-be-encoded reference frame is also 1/4. In this case, it may be determined, according to a multiple relationship between downsampling proportions of the two, to perform downsampling on the current reference frame in a sampling proportion of 2, to obtain a frame with a resolution the same as that of the current frame.

In an embodiment, a sampling method for sampling the current reference frame matches a sampling algorithm by which the input video frame is downsampled to obtain the current frame. To be specific, if the current reference frame needs to be downsampled, the downsampling algorithm is the same as the downsampling algorithm by which the current video frame is downsampled to obtain the current frame. If the current reference frame needs to be upsampled, the upsampling algorithm is a sampling algorithm opposite to a sampling algorithm matching the downsampling algorithm by which the input video frame is downsampled to obtain the current frame.

In this embodiment, the sampling algorithm for sampling the current reference frame matches the sampling algorithm by which the current video frame is downsampled to obtain the current coded video frame, to further improve a degree of image matching between the current reference frame and the current coded video frame, thereby further improving accuracy of inter prediction, reducing a prediction residual, and improving quality of an encoded image.

Step S1104: Encode the current frame according to the target reference frame, to obtain the encoded data corresponding to the input video frame.

Optionally, after obtaining the target reference frame, the computer device finds, from the target reference frame, an image block similar to a code block as a reference block, and calculate a pixel difference between the code block and the reference block, to obtain the prediction residual. A first motion vector is obtained according to displacement between the code block and the corresponding target reference block. The encoded data is obtained according to the first motion vector and the prediction residual.

In an embodiment, the first motion vector may be transformed according to target motion vector unit resolution information, to obtain a target motion vector in a target resolution, and the encoded data is generated according to the target motion vector and the prediction residual. The method for transforming the first motion vector according to the target motion vector unit resolution information, to obtain the target motion vector is described below.

In an embodiment, the computer device may also calculate a vector difference between the target motion vector and a corresponding predicted vector, and encode the vector difference, to obtain encoded data, and further reduce an amount of encoded data. A step of calculating the vector difference may include: obtaining an initial predicted motion vector corresponding to a current code block; obtaining a second vector transform coefficient according to current motion vector unit resolution information corresponding to the initial predicted motion vector and target motion vector unit resolution information; obtaining a target predicted motion vector corresponding to the current code block according to the initial predicted motion vector and the second vector transform coefficient; and obtaining a motion vector difference according to a target motion vector and the target predicted motion vector. The target predicted motion vector is a motion vector in the target resolution, and a method for calculating the vector difference is described below.

In an embodiment, step S1102, that is, sampling the current reference frame according to the resolution information of the current frame, to obtain a corresponding target reference frame includes: sampling the current reference frame according to the resolution information of the current frame and motion estimation pixel precision, to obtain the corresponding target reference frame.

The motion estimation pixel precision is a unit length of a motion vector corresponding to a code block in the current frame. When encoding the code block in the current frame, the computer device may refine a unit length of a motion vector corresponding to the code block according to the obtained motion estimation pixel precision, so that the obtained motion vector is more refined and accurate. Therefore, the current reference frame needs to be sampled according to the obtained motion estimation pixel precision, to obtain the target reference frame, a first motion vector corresponding to each code block in the current frame is then calculated according to the target reference frame, and encoding is performed based on the first motion vector, to obtain the encoded data corresponding to the current frame.

Optionally, resolution information of the current reference frame may be obtained, and a sampling processing method performed on the current reference frame, a sampling proportion corresponding to the sampling, and pixel interpolation precision are determined according to the subpixel interpolation manner used for the current frame, the resolution information of the current frame, the resolution information of the current reference frame, and the motion estimation pixel precision corresponding to the current frame. The motion estimation pixel precision may be set according to a requirement, for example, is generally 1/2 pixel precision, 1/4 pixel precision, or 1/8 pixel precision.

In an embodiment, the computer device may configure corresponding motion estimation pixel precision for the current frame according to the image feature information of the current frame, and the image feature information, for example, may be a size, textual information, and a motion speed of the current frame. The motion estimation pixel precision corresponding to the current frame may be determined by integrating a plurality of types of image feature information. More complex image data carried in the current frame indicates richer image information, and higher corresponding motion estimation pixel precision. For example, when inter prediction is performed on a P frame, a motion vector corresponding to each code block in the P frame may be calculated by using relatively high motion estimation pixel precision, and when inter prediction is performed on a B frame, a motion vector corresponding to each code block in the B frame may be calculated by using relatively low motion estimation pixel precision.

In an embodiment, the sampling the current reference frame according to the resolution information of the current frame and motion estimation pixel precision, to obtain the corresponding target reference frame includes: calculating pixel interpolation precision according to the resolution information of the current frame and the motion estimation pixel precision; and directly performing subpixel interpolation on the current reference frame according to the pixel interpolation precision, to obtain the corresponding target reference frame.

Optionally, the pixel interpolation precision is pixel precision corresponding to subpixel interpolation performed on the current reference frame. When the subpixel interpolation manner is the direct subpixel interpolation manner, it indicates that subpixel interpolation may be directly performed on the current reference frame, to obtain the target reference frame. Therefore, the computer device may calculate the pixel interpolation precision according to the resolution information of the current frame and the motion estimation pixel precision. A ratio of the resolution information of the current reference frame to the resolution information of the current frame may be calculated, and the pixel interpolation precision is obtained according to the ratio and the motion estimation pixel precision.

In an embodiment, when the resolution of the current reference frame is greater than the resolution of the current frame, data of some subpixels in the current reference frame may be directly reused, and may be used as data corresponding to subpixels corresponding to the motion estimation pixel precision. For example, the resolution of the current frame is M*N, and the resolution of the current reference frame is 2M*2N. If the motion estimation pixel precision is 1/2, and the pixel interpolation precision is 1, the current reference frame may be directly used as the target reference frame. If the motion estimation pixel precision is 1/4, the calculated pixel interpolation precision is 1/2, and the subpixel interpolation may be performed on the current reference frame by using 1/2 pixel interpolation precision, to obtain the target reference frame.

In an embodiment, when the resolution represented by the resolution information of the current frame is the same as the resolution of the current reference frame, subpixel interpolation is directly performed on the current reference frame according to the motion estimation pixel precision, to obtain the corresponding target reference frame.

Optionally, when the current frame is obtained by processing the input video frame by using the full-resolution processing manner, and the resolution of the current reference frame is also the original resolution, the resolution of the current frame is the same as the resolution of the current reference frame. Alternatively, when the current frame is obtained by processing the input video frame by using the downsampling manner, and the current reference frame is also obtained by reconstructing encoded data obtained through encoding by using the downsampling manner with the same proportion, the resolution of the current frame is the same as the resolution of the current reference frame. Then, subpixel interpolation may be directly performed on the current reference frame based on the motion estimation pixel precision, to obtain the target reference frame, and the pixel interpolation precision corresponding to the subpixel interpolation is the same as the motion estimation pixel precision.

In an embodiment, the sampling the current reference frame according to the resolution information of the current frame and motion estimation pixel precision, to obtain the corresponding target reference frame includes: sampling the current reference frame according to the resolution information of the current frame, to obtain an intermediate reference frame; and performing subpixel interpolation on the intermediate reference frame according to the motion estimation pixel precision, to obtain the target reference frame.

Optionally, when the subpixel interpolation manner corresponding to the current frame is the subpixel interpolation manner after sampling, it indicates that the current reference frame first needs to be sampled, to obtain the intermediate reference frame with a resolution the same as that of the current frame, and then subpixel interpolation is performed on the intermediate reference frame, to obtain the corresponding target reference frame.

When the resolution represented by the resolution information of the current frame is less than the resolution of the current reference frame, the current reference frame is downsampled according to the resolution information of the current frame, to obtain the intermediate reference frame; and subpixel interpolation is performed on the intermediate reference frame according to the motion estimation pixel precision corresponding to the current frame, to obtain the target reference frame. For example, if an input video frame with a resolution of 2M*2N is downsampled according to a downsampling processing manner, to obtain a current frame with a resolution of M*N, and the resolution of the current reference frame is 2M*2N (the full-resolution processing manner), the current reference frame is downsampled according to a sampling proportion of 1/2, to obtain an intermediate reference frame with a resolution of M*N. If motion estimation pixel precision corresponding to the obtained current frame is 1/2, subpixel interpolation is then performed on the intermediate reference frame according to pixel interpolation precision the same as the motion estimation pixel precision, that is, the 1/2 subpixel interpolation precision, to obtain the target reference frame. If the motion estimation pixel precision corresponding to the obtained current frame is 1/4, subpixel interpolation is performed on the intermediate reference frame according to the 1/4 subpixel interpolation precision, to obtain the target reference frame.

When the resolution represented by the resolution information of the current frame is greater than the resolution of the current reference frame, the computer device upsamples the current reference frame according to the resolution information of the current frame, to obtain the intermediate reference frame; and then perform subpixel interpolation on the intermediate reference frame according to the motion estimation pixel precision corresponding to the current frame, to obtain the target reference frame. For example, if the resolution of the current frame is 2M*2N, and the resolution of the current reference frame is (1/2)M*(1/2)N, the current reference frame needs to be upsampled according to a sampling proportion of 4, to obtain an intermediate reference frame with a solution the same as that of the current frame. If the motion estimation pixel precision is 1/2, subpixel interpolation continues to be performed on the obtained intermediate reference frame according to 1/2 pixel interpolation precision, to obtain the target reference frame. If the motion estimation pixel precision is 1/4, subpixel interpolation continues to be performed on the obtained intermediate reference frame according to 1/4 pixel interpolation precision, to obtain the target reference frame.

Figure 14:
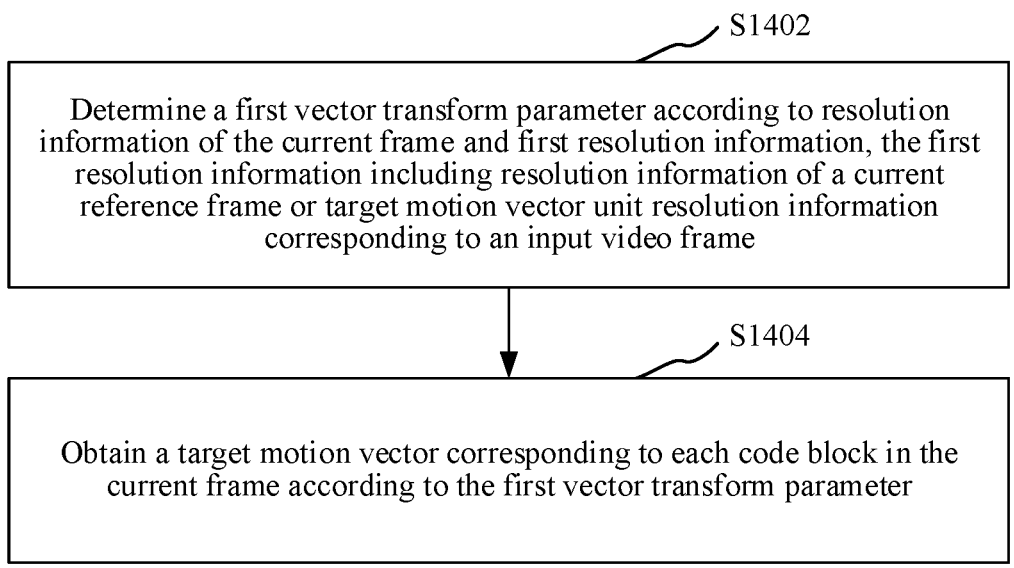
FIG. 14 is a flowchart of encoding a current frame according to a current reference frame in a resolution of the current frame, to obtain encoded data corresponding to an input video frame according to an exemplary embodiment of this application.

As shown in FIG. 14, that is, the encoding the current frame according to the current reference frame in the resolution of the current frame, to obtain the encoded data corresponding to the input video frame includes the following steps:

Step S1402: Determine a first vector transform parameter according to the resolution information of the current frame and first resolution information, the first resolution information including resolution information of the current reference frame or target motion vector unit resolution information corresponding to the input video frame.

Optionally, the first vector transform parameter is used for transforming location information of an obtained motion vector or the motion vector. The resolution information is information related to a resolution, for example, may be the resolution or a downsampling proportion. The first vector transform parameter may be a ratio of the resolution information of the current frame to the first resolution information. For example, assuming that the downsampling proportion of the current reference frame is 1/3, and the downsampling proportion of the current frame is 1/6, the first vector transform parameter may be obtained by dividing 1/3 by 1/6, that is, 2.

Step S1404: Obtain a target motion vector corresponding to each code block in the current frame according to the first vector transform parameter.

Optionally, after obtaining the first vector transform parameter, the computer device transforms the obtained motion vector or the location information corresponding to the motion vector according to the first vector transform parameter, to obtain the target motion vector. When the target motion vector is transformed by using the first vector transform parameter, the target motion vector is a motion vector in a target resolution represented by the target motion vector unit resolution information. The target motion vector unit resolution information is information corresponding to a target resolution corresponding to a unit of the target motion vector, and for example, may be the target resolution or a downsampling proportion. When the location information corresponding to the motion vector is transformed by using the first vector transform parameter, the location information corresponding to the current frame and the location information of the current reference frame are in the same quantization scale, a second motion vector is obtained according to transformed location information, and the second motion vector is transformed into the target motion vector in the target resolution.

In an embodiment, step S1402, that is, determining a first vector transform parameter according to the resolution information of the current frame and first resolution information includes: determining the first vector transform parameter according to the resolution information of the current frame and the resolution information of the current reference frame. Step S1404, that is, obtaining a target motion vector corresponding to each code block in the current frame according to the first vector transform parameter includes: obtaining first location information corresponding to a current code block, and obtaining second location information corresponding to a target reference block corresponding to the current code block; and calculating a target motion vector corresponding to the current code block according to the first vector transform parameter, the first location information, and the second location information.

Optionally, the current code block is a code block, on which predictive encoding needs to be currently performed, in the input video frame. The target reference block is an image block used for performing predictive encoding on the current code block in the reference frame. The first location information corresponding to the current code block may be represented by a coordinate of a pixel. The first location information corresponding to the current code block may include coordinates corresponding to all pixels of the current code block, and the first location information corresponding to the current code block may alternatively include coordinates of one or more pixels of the current code block. The second location information corresponding to the target reference block may include coordinates corresponding to all pixels of the target reference block, and the second location information corresponding to the target reference block may alternatively include coordinates of one or more pixels of the target reference block. For example, a coordinate of the first pixel of the current image block may be used as a coordinate value of the current code block, and a coordinate of the first pixel of the target reference block may be used as a coordinate value of the target reference block.

In an embodiment, the first location information may be transformed by using the first vector transform parameter, to obtain corresponding first transformed location information, and the target motion vector is obtained according to a difference between the first transformed location information and the second location information. Alternatively, the second location information may be transformed by using the first vector transform parameter, to obtain corresponding second transformed location information, and the target motion vector is obtained according to a difference between the first location information and the second transformed location information.

In an embodiment, the first vector transform parameter is a proportion obtained by dividing larger resolution information by smaller resolution information in the resolution information of the current frame and the resolution information of the current reference frame, where a resolution corresponding to the larger resolution information is greater than a resolution corresponding to the smaller resolution information. The first vector transform parameter is used for transforming location information of a frame of the smaller resolution information in the current frame and the current reference frame. For example, if the resolution of the current frame is 1200*1200 pixels and the resolution of the current reference frame is 600*600 pixels, the larger resolution is 1200*1200 pixels, and the smaller resolution is 600*600 pixels. The first vector transform parameter may be 2. Assuming that the first location information is (6, 8), and the second location information is (3, 3), the target motion vector is (6, 8)−(3*2, 3*2)=(0, 2). In this embodiment of this application, location information corresponding to the frame of the smaller resolution information is transformed, to reduce a value of the target motion vector, and reduce a data amount of the encoded data.

In an embodiment, the first vector transform parameter is a proportion obtained by dividing smaller resolution information by larger resolution information in the resolution information of the current frame and the resolution information of the current reference frame, where the first vector transform parameter is used for transforming the location information of the frame of the larger resolution information in the current frame and the current reference frame. For example, assuming that the resolution of the current frame is 1200*1200 pixels, and the resolution of the current reference frame is 600*600 pixels, the first vector transform parameter may be 1/2. Assuming that the first location information is (6, 8), and the second location information is (3, 3), the target motion vector is (6*1/2, 8*1/2)−(3, 3)=(0, 1).

Figure 15:
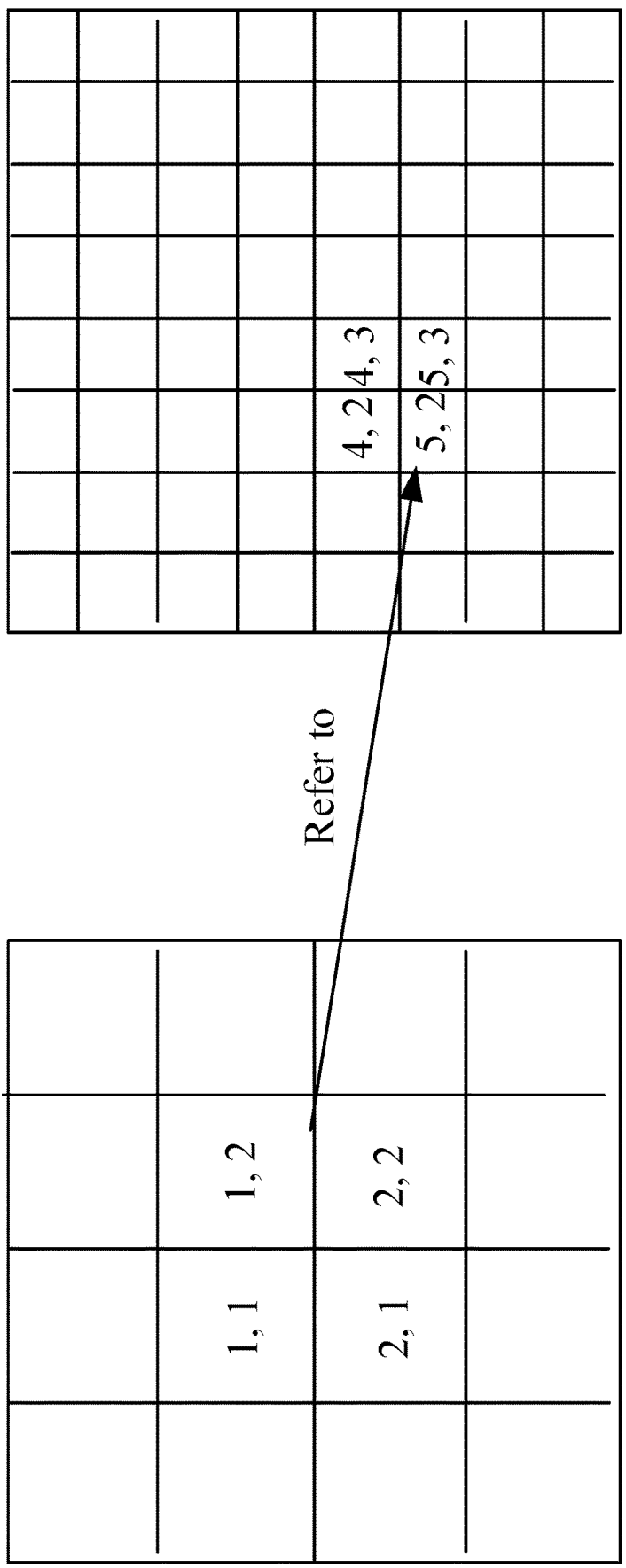
FIG. 15 is a schematic diagram of a current reference frame and a current frame according to an exemplary embodiment of this application.

In this embodiment of this application, the location information is transformed by using the first vector transform parameter, so that obtained location information is in the same quantization scale, to reduce a value of the target motion vector, and reduce a data amount of the encoded data. For example, as shown in FIG. 15, the resolution of the current reference frame is twice that of the current frame, the current code block is formed by pixels (1, 1), (1, 2), (2, 1), and (2, 2), and the corresponding target reference block is formed by pixels (4, 2), (4, 3), (5, 2), and (5, 3). If transform is not performed, the target motion vector is (−3, −1). If corresponding location information in the current frame is multiplied by 2 during calculation of the target motion vector, and then the target motion vector is calculated, the target motion vector is (−2, 0), which is less than (−3, −1).

In an embodiment, step S1402, that is, determining a first vector transform parameter according to the resolution information of the current frame and first resolution information includes: obtaining the target motion vector unit resolution information; and determining the first vector transform parameter according to the resolution information of the current frame and the target motion vector unit resolution information. Step S1404, that is, obtaining a target motion vector corresponding to each code block in the current frame according to the first vector transform parameter includes: obtaining a first motion vector according to displacement between the current code block and the corresponding target reference block; and obtaining the target motion vector corresponding to the current code block according to the first vector transform parameter and the first motion vector.

Optionally, the target motion vector unit resolution information is information corresponding to a target resolution corresponding to a unit of the target motion vector, and for example, may be the target resolution or a corresponding downsampling proportion. The target motion vector is calculated by using a vector unit in the resolution as a standard. Some of current frames corresponding to the input video sequence may have resolutions the same as the original resolution of the input video frame, and resolutions of some other current frames are less than the original resolution of the input video frame, that is, there are a plurality of resolutions of the current frames in the video sequence. Therefore, a resolution corresponding to a unit of the target motion vector needs to be determined. The resolution corresponding to the unit of the target motion vector may be set before encoding or obtained according to a parameter of an encoding process, and may be specifically set according to a requirement.

The first motion vector is obtained according to displacement between the current code block and the corresponding target reference block. The target reference block may be obtained from the current reference frame, or from the target reference frame obtained by processing the current reference frame. After the first motion vector is obtained, the first vector transform parameter may be multiplied by the first motion vector, and the obtained product is used as the target motion vector. For example, it is assumed that the resolution corresponding to the target motion vector unit is the original resolution, and the downsampling proportion corresponding to the current frame is 1/2. The target motion vector unit is the original resolution, and the first motion vector is calculated in the resolution of the current frame. Therefore, the first motion vector needs to be transformed. The first vector transform parameter is 2. When the obtained first motion vector is (2, 2), the target motion vector is (4, 4). After obtaining the target motion vector, encoding may be performed according to the target motion vector. For example, the target motion vector and the prediction residual corresponding to the current code block may be encoded, to obtain the encoded data.

In an embodiment, when the target reference block is obtained from the current reference frame, it may be understood that for the same code block, the first motion vector may be equal to the second motion vector.

In an embodiment, the resolution corresponding to the unit of the target motion vector may be the resolution corresponding to the input video frame, that is, the original resolution, or the resolution corresponding to the unit of the target motion vector may be the resolution corresponding to the current frame. The first vector transform parameter may be a ratio of the resolution information corresponding to the target motion vector unit to the resolution information of the current frame. For example, it is assumed that the resolution corresponding to the target motion vector unit is the original resolution, the sampling proportion corresponding to the target motion vector unit is 1, and the sampling proportion of the resolution of the current frame is 1/2, the first vector transform parameter may be obtained by dividing 1 by 1/2, that is, 2. Alternatively, it is assumed that the resolution corresponding to the target motion vector unit is the original resolution, that is, 900*900 pixels, the resolution of the current frame is 450*600 pixels, and there may be two first vector transform parameters, that is, a first vector transform parameter in a horizontal direction and a first vector transform parameter in a vertical direction. Therefore, the first vector transform parameter in the horizontal direction is 900/450=2, and the first vector transform parameter in the vertical direction is 900/600=1.5.

In an embodiment, the computer device may obtain target motion vector unit resolution information according to a computing capability of a device performing encoding. For example, when the device performing encoding can perform computing only on integers or spends long time in computing when a value is a decimal, the resolution corresponding to the target motion vector unit may be the original resolution corresponding to the input video frame. When the device performing encoding can quickly compute decimals, the resolution corresponding to the target motion vector unit may be the resolution corresponding to the current frame.

In an embodiment, when the resolution information of the current frame is consistent with the target motion vector unit resolution information, the first vector transform parameter is 1, and the first motion vector is the same as the target motion vector. Therefore, step S1402 may be skipped, and the first motion vector is used as the target motion vector. When the resolution information of the current frame is inconsistent with the target motion vector unit resolution information, step S1402 is performed.

In this embodiment of this application, when the resolution corresponding to the unit of the target motion vector is the resolution corresponding to the input video frame, that is, the original resolution, for a video sequence with consistent resolutions, target resolutions corresponding to the input video frames are consistent, so that consistency of the target motion vector can be kept. When the resolution corresponding to the unit of the target motion vector is the resolution corresponding to the current video frame, because the resolution information of the current frame is consistent with the target motion vector unit resolution information, the first motion vector does not need to be transformed, so that calculation time can be reduced.

In an embodiment, the computer device may add identification information representing the target motion vector unit resolution information to the encoded data, so that the decoding end may obtain the target resolution corresponding to the target motion vector. If the identification information is not carried, the encoding end and the decoding end may agree on the target resolution corresponding to the target motion vector. The identification information is used for representing the resolution information corresponding to the target motion vector. An adding location of the identification information in the encoded data may be one or more of group-level header information, sequence-level header information, frame-level header information, and block-level header information. The block-level header information is header information of encoded data corresponding to the code block. The adding location of the identification information in the encoded data may be determined according to an action range of the target motion vector unit resolution information. For example, if resolutions corresponding to the vector units in the video sequence are consistent, the adding location may be the sequence-level header information. Resolution information represented by a specific value of a flag bit may be set according to a requirement. For example, when the resolution corresponding to the target motion vector unit resolution information is the original resolution, a corresponding flag bit MV_Scale_Adaptive is 0. When the resolution corresponding to the target motion vector unit resolution information is the resolution corresponding to the current frame, the corresponding flag bit MV_Scale_Adaptive is 1.

Figure 16:
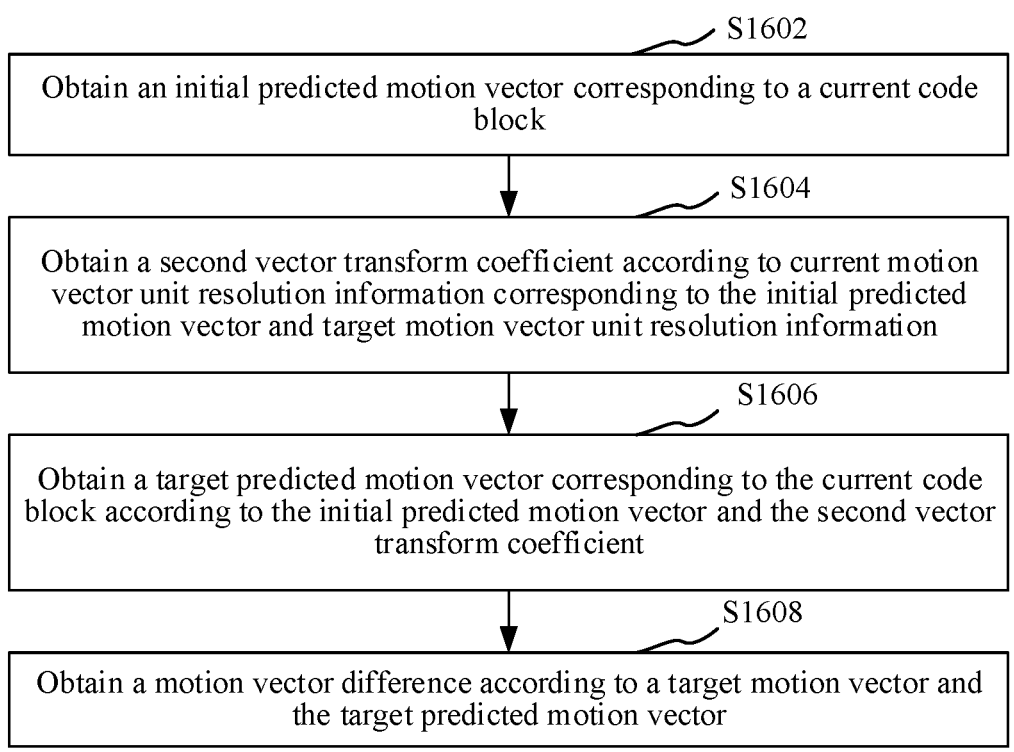
FIG. 16 is a flowchart of encoding a current frame according to a reference frame, to obtain encoded data corresponding to an input video frame according to an exemplary embodiment of this application.

In an embodiment, as shown in FIG. 16, the encoding the current frame according to the current reference frame, to obtain the encoded data corresponding to the input video frame includes the following steps:

Step S1602: Obtain an initial predicted motion vector corresponding to a current code block.

Optionally, to reduce a quantity of bits used for the encoded data, the computer device may predict a motion vector of the current code block, to obtain a predicted value; calculate a difference between the target motion vector and the predicted value, to obtain a motion vector difference; and encode the motion vector difference. The initial predicted motion vector is used for predicting the motion vector of the current code block. There may be one or more initial predicted motion vectors, and this may be specifically set according to a requirement. A rule for obtaining the initial predicted motion vector may be set according to a requirement. Because the current code block usually has spatial correlation with a code block adjacent thereto, a target motion vector value corresponding to one or more adjacent encoded blocks corresponding to the current code block may be used as the initial predicted motion vector. For example, the first motion vector value corresponding to adjacent encoded blocks in the upper right corner and the upper left corner of the current code block may be used as the initial predicted motion vector. Alternatively, a motion vector value of the target reference block corresponding to the target reference block corresponding to the current code block may be used as the initial predicted motion vector.

Step S1604: Obtain a second vector transform coefficient according to current motion vector unit resolution information corresponding to the initial predicted motion vector and the target motion vector unit resolution information.

Optionally, the current motion vector unit resolution information is information corresponding to the current resolution corresponding to a unit of the initial predicted motion vector, and for example, may be a current resolution or a downsampling proportion. The resolution corresponding to the unit of the initial predicted motion vector means that the unit of the initial predicted motion vector is calculated by using a vector unit in the current resolution as a standard, that is, the motion vector in the current resolution. When the current motion vector unit resolution information corresponding to the initial predicted motion vector is different from the target motion vector unit resolution information, a second vector transform coefficient needs to be obtained according to the current motion vector unit resolution information corresponding to the initial predicted motion vector and the target motion vector unit resolution information. The second vector transform parameter is used for transforming the initial predicted motion vector into a motion vector in the target resolution, and may be a ratio of the resolution information corresponding to the target motion vector unit to the current motion vector unit resolution information. For example, assuming that the resolution corresponding to the target motion vector unit is 200*200 pixels, and the current motion vector unit resolution information is 100*100 pixels, the second vector transform parameter may be 2.

Step S1606: Obtain a target predicted motion vector corresponding to the current code block according to the initial predicted motion vector and the second vector transform coefficient.

Optionally, after the second vector transform parameter is obtained, the target predicted motion vector is obtained by performing calculation according to the initial predicted motion vector and the second vector transform coefficient, where the target predicted motion vector is a predicted motion vector in the target resolution. For example, when there is one initial predicted motion vector, the computer device may use a product between the initial predicted motion vector and the second vector transform coefficient as the target predicted motion vector. When there are a plurality of initial predicted motion vectors, the computer device may calculate the initial predicted motion vectors, to obtain a calculation result, and obtain the target motion vector according to the calculation result and the second vector transform coefficient. The calculation result may be one or more of a minimum value, an average value, and an intermediate value in the initial predicted motion vectors. It may be understood that, an algorithm for obtaining the target predicted motion vector according to the initial predicted motion vector and the second vector transform coefficient may be user-defined, and the same target predicted motion vector may be calculated by using a consistent user-defined algorithm at the decoding end.

Step S1608: Obtain a motion vector difference according to a target motion vector and the target predicted motion vector.

Optionally, the difference between the target motion vector and the target predicted motion vector is used as the motion vector difference, to perform encoding according to the motion vector difference, to obtain the encoded data, thereby reducing a data amount of the encoded data.

In this embodiment of this application, the initial predicted motion vector is transformed, to obtain the target predicted motion vector in the target resolution, so that units of the target predicted motion vector and the target motion vector are in a matching quantization scale. Therefore, the obtained motion vector difference is small, and the data amount of the encoded data is reduced.

Figure 17:
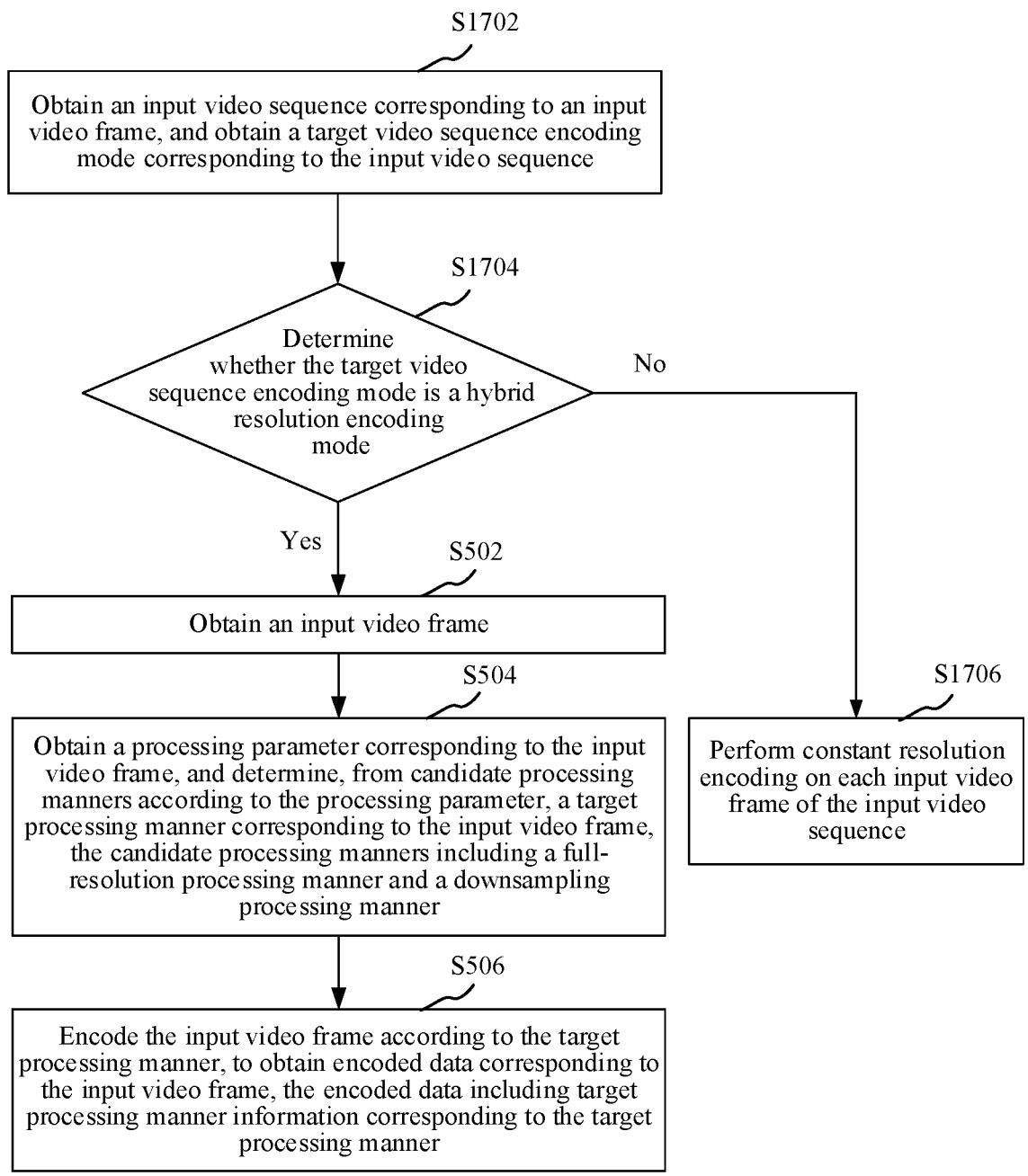
FIG. 17 is a flowchart of a video encoding method according to an exemplary embodiment of this application.

In an embodiment, as shown in FIG. 17, before the obtaining an input video frame, the video encoding method further includes the following steps:

Step S1702: Obtain an input video sequence corresponding to the input video frame, and obtain a target video sequence encoding mode corresponding to the input video sequence, the target video sequence encoding mode including a constant resolution encoding mode or a hybrid resolution encoding mode.

Optionally, the input video sequence may include a plurality of input video frames. When the target video sequence encoding mode is the constant resolution encoding mode, each input video frame of the input video sequence is encoded in the same resolution, such as a full resolution. When the target video sequence encoding mode is the hybrid resolution encoding mode, the computer device obtains the target processing manner corresponding to each input video frame, and processes the input video frame according to the processing manner, to obtain a current frame. When the current frame is encoded, a resolution of the current frame may be the same as the resolution of the input video frame, or less than the resolution of the input video frame. In the input video sequence, the current frames have different resolutions. Therefore, when the video sequence encoding mode is the hybrid resolution encoding mode, the video encoding method provided in the foregoing embodiment is performed.

In an embodiment, the obtaining a target video sequence encoding mode corresponding to the input video sequence includes: obtaining current environmental information, the current environmental information including at least one of current encoding environmental information and current decoding environmental information; and determining the target video sequence encoding mode corresponding to the input video sequence according to the current environmental information.

Optionally, the environmental information may include one or more of a processing capability of a device performing the video encoding method, a processing capability of a device performing a video decoding method, and current application scenario information. The processing capability may be represented by a processing speed. For example, for a device having a strong processing capability, because the processing speed is high, the corresponding target video sequence encoding mode is the full-resolution encoding mode. When the current application scenario corresponding to the current application scenario information is a real-time application scenario, the video sequence encoding mode is the hybrid resolution encoding mode. When the current application scenario corresponding to the current application scenario information is a non-real-time application scenario, the video sequence encoding mode is the constant resolution encoding mode. A correspondence between the current environmental information and the video sequence encoding mode may be set. When the current environmental information is obtained, the target video sequence encoding mode corresponding to the input video sequence is obtained according to the correspondence between the current environmental information and the video sequence encoding mode. For example, a correspondence between the video sequence encoding mode and an average value of a processing speed of the device performing the video encoding method and a processing speed of the device performing the video decoding method may be set. After the processing speed of the device performing the video encoding method and the processing speed of the device performing the video decoding method are obtained, the average value is calculated, and the target video sequence encoding mode is obtained according to the average value. Whether the current application scenario is a real-time application scenario may be set according to a requirement. For example, a video call application scenario and a game application scenario are real-time application scenarios, and application scenarios corresponding to video encoding on a video website and encoding of an offline video may be non-real-time application scenarios.

Step S1704: Determine whether the target video sequence encoding mode is the hybrid resolution encoding mode.

If so, step S502 is performed, and if not, step S1706 is performed.

Step S1706: Perform constant resolution encoding on each input video frame of the input video sequence.

Optionally, when the video sequence encoding mode is the constant resolution encoding mode, the computer device performs constant resolution encoding on each input video frame of the input video sequence.

In an embodiment, the encoding the current frame in the resolution of the current frame, to obtain encoded data corresponding to the input video frame includes: adding video sequence encoding mode information corresponding to the target video sequence encoding mode to the encoded data.

Optionally, the video sequence encoding mode information is used for describing an encoding mode used for the input video sequence, and a flag bit Sequence_Mix_Resolution_Flag describing the video sequence encoding mode may be added to the encoded data, and a specific value of the flag bit may be set according to a requirement. An adding location of the video sequence encoding mode information in the encoded data may be the sequence-level header information. For example, when Sequence_Mix_Resolution_Flag is 1, the corresponding target video sequence encoding mode may be the hybrid resolution encoding mode. When Sequence_Mix_Resolution_Flag is 0, the corresponding target video sequence encoding mode may be the constant resolution encoding mode.

Figure 18:
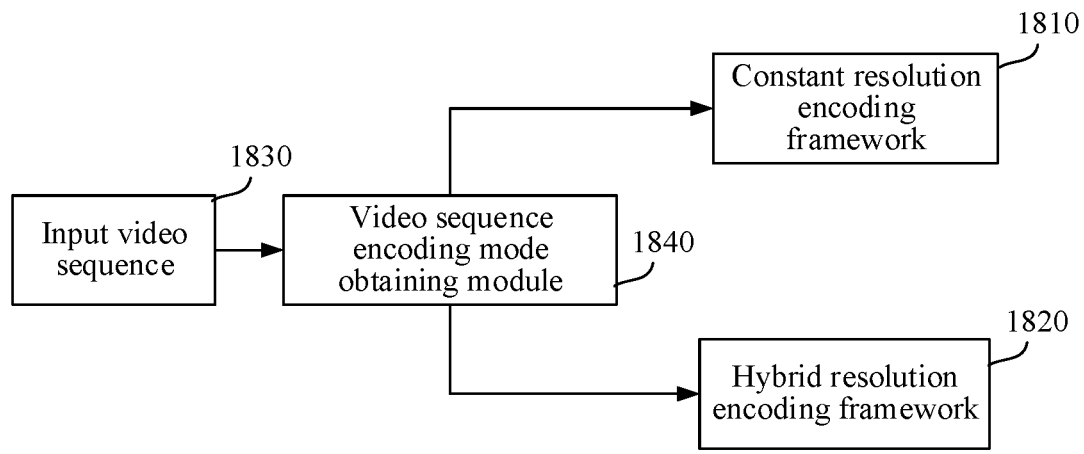
FIG. 18 is a schematic diagram of a video encoding framework according to an exemplary embodiment of this application.

In an embodiment, a video encoding framework is shown in FIG. 18. The video encoding framework includes a constant resolution encoding framework 1810 and a hybrid resolution encoding framework 1820, and the hybrid resolution encoding framework 1820 may correspond to the encoding framework in FIG. 2. After the input video sequence 1830 is obtained, the video sequence 1830 encoding mode is decided at a video sequence encoding mode obtaining module 1840. When the target video sequence encoding mode is the hybrid resolution encoding mode, encoding is performed by using the hybrid resolution encoding framework 1820. When the target video sequence encoding mode is the constant resolution encoding mode, constant resolution encoding is performed by using the constant resolution encoding framework 1810 in FIG. 18. The constant resolution encoding framework 1810 may be a current HEVC encoding framework, an H.265 encoding framework, or the like.

The video encoding method is described below by using an assumption in which a video sequence A includes three input video frames: a, b, and c.

1. A target video sequence encoding mode corresponding to the video sequence A is obtained. Because a current environment is a video call environment, the target video sequence encoding mode is a hybrid resolution encoding mode.

2. The first input video frame a is decided by using a processing decision unit in the hybrid resolution encoding framework, to obtain that the processing manner is the downsampling manner, and the downsampling proportion is 1/2; a is downsampled, to obtain a downsampled video frame a1 obtained, and intra-frame encoding is performed on a1, to obtain encoded data d1 corresponding to a1, and the encoded data corresponding to a1 is reconstructed, to obtain a corresponding reconstructed video frame a2.

3. The second input video frame b is decided by using the processing decision unit in the hybrid resolution encoding framework, to obtain that the processing manner is the downsampling manner, and the sampling proportion is 1/4. b is downsampled to obtain b1, and b1 is encoded to obtain encoded data corresponding to b. Then sampling proportion information corresponding to the downsampling proportion and target processing manner information corresponding to the target processing manner are carried in the encoded data.

The encoding process includes that: because b is an inter predicted frame, a2 needs to be used as a current reference frame; and because the resolution of b1 is different from that of a2, a2 needs to be sampled. The sampling manner of a2 is determined as direct subpixel interpolation, and the motion estimation precision is 1/4, and therefore the pixel interpolation precision is 1/4*2=1/2. 1/2 subpixel interpolation is performed on a2 according to the pixel interpolation precision, to obtain a target reference frame a3. A first motion vector MV1 is calculated according to displacement between the current code block in b1 and the target reference block in the target reference frame, and a prediction residual is p1. It is obtained that the target resolution is the original resolution, and therefore, the target motion vector is 4MV1. It is obtained through calculation that an initial predicted vector is MV2, and the initial predicted vector is calculated in a resolution corresponding to the 1/4 downsampling proportion. Therefore, the target predicted vector is 4MV2, and as a result, a motion vector difference MVD1 corresponding to the current code block is 4MV1-4MV2. Transform, quantization, and entropy encoding are performed on MVD1 and p1, to obtain the encoded data.

4. The third input video frame c is decided by using the processing decision unit in the hybrid resolution encoding framework, to obtain that the processing manner is the downsampling manner, and the sampling proportion is 1/8. c is downsampled, to obtain c1, and c1 is encoded, to obtain encoded data d2 corresponding to c.

The encoding process includes: because c is an inter predicted frame, the corresponding current reference frame is a reconstructed video frame b2 obtained by reconstructing the encoded data of b; and because the resolution of c1 is different from that of b2, b2 needs to be sampled. The sampling manner of b2 is determined as direct subpixel interpolation, and the motion estimation precision is 1/4, and therefore the pixel interpolation precision is 1/4*2=1/2. 1/2 subpixel interpolation is performed on b2 according to the pixel interpolation precision, to obtain a target reference frame b3. A first motion vector MV3 is calculated according to displacement between the current code block in c1 and the target reference block in the target reference frame, and a prediction residual is p2. It is obtained that the target resolution is the original resolution, and therefore, the target motion vector is 8MV3. It is obtained that an initial predicted vector is MV4, and the initial predicted vector is calculated in a resolution corresponding to the 1/4 downsampling proportion. Therefore, the target predicted vector is 4MV4, and as a result, a motion vector difference MVD2 corresponding to the current code block is 8MV3-4MV4. Transform, quantization, and entropy encoding are performed on MVD2 and p2, to obtain encoded data d3.

5. d1, d2, and d3 are formed into an encoded data packet, which is used as encoded data corresponding to the video sequence and sent to a receiving terminal. The encoded data corresponding to the video sequence carries a flag bit describing that the target video sequence encoding mode is the hybrid resolution encoding mode.

Figure 19:
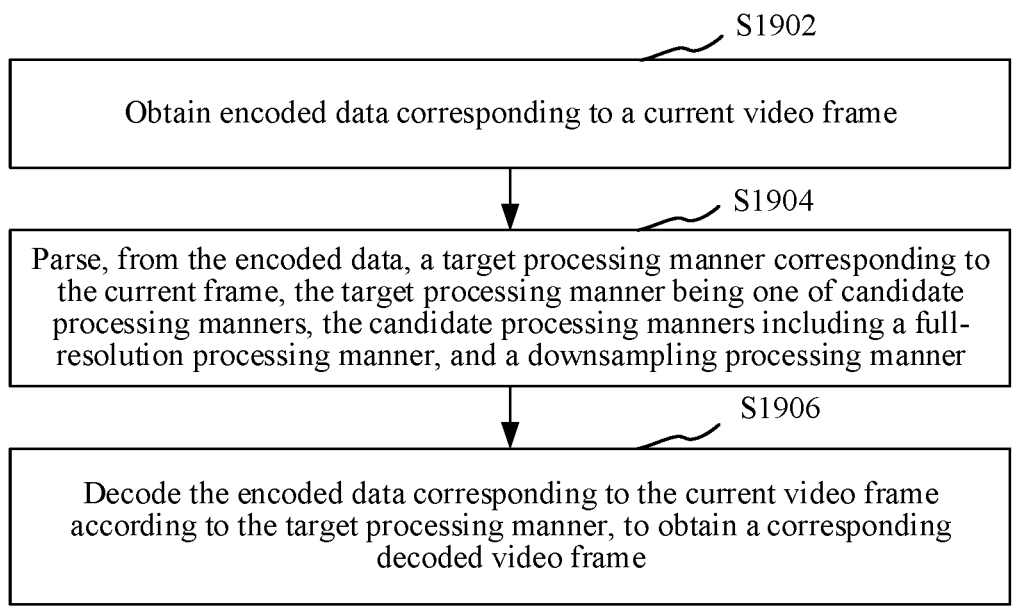
FIG. 19 is a flowchart of a video decoding method according to an exemplary embodiment of this application.

As shown in FIG. 19, in an embodiment, a video decoding method is provided. In this embodiment, description is mainly made by using an example in which the method is applied to the terminal 110 or the server 120 in FIG. 1. The method may specifically include the following steps:

Step S1902: Obtain encoded data corresponding to a current video frame.

Optionally, the current video frame is a video frame that needs to be decoded. One to-be-decoded video sequence may include a plurality of current video frames. The current video frame may be a video frame obtained in real time by a computer device, or a video frame obtained in a to-be-decoded video sequence pre-stored by the computer device.

Step S1904: Parse, from the encoded data, a target processing manner corresponding to the current frame, the target processing manner being one of candidate processing manners, the candidate processing manners including a full-resolution processing manner, and a downsampling processing manner.

Optionally, the encoded data includes target processing manner information corresponding to the target processing manner, and the target processing manner information may be parsed out in the frame-level encoding header information. For example, the computer device may parse, in the encoded data, the flag bit Frame_Resolution_Flag describing the processing manner. When it is obtained that Frame_Resolution_Flag is 0, the corresponding target processing manner is the full-resolution processing manner, and when it is obtained that Frame_Resolution_Flag is 1, the corresponding target processing manner is the downsampling processing manner.

Step S1906: Decode the encoded data corresponding to the current video frame according to the target processing manner, to obtain a corresponding decoded video frame.

Optionally, the resolution information may be the resolution or a sampling proportion. After the target processing manner is obtained, the resolution information corresponding to the current video frame is determined according to the target processing manner. When the target processing manner is the full-resolution processing manner, the corresponding resolution is the original resolution, and the downsampling proportion is 1. When the target processing manner is the downsampling processing manner, the computer device may obtain the corresponding downsampling proportion from the encoded data, and the encoded data may carry the original resolution corresponding to the input video frame. After the resolution information is obtained, the current video frame is decoded according to the resolution information, to obtain a corresponding reconstructed video frame.

In an embodiment, the encoded data carries downsampling proportion information corresponding to the current video frame. For example, the sequence-level header information of the video sequence carries downsampling proportion information corresponding to the downsampling proportion when the target processing manner corresponding to the current video frame is the downsampling processing manner. When it is obtained that the target processing manner is the downsampling processing manner, the downsampling proportion corresponding to the current video frame is determined according to the downsampling proportion information carried in the encoded data.

In an embodiment, a downsampling proportion corresponding to that the target processing manner corresponding to the input video frame is the downsampling processing manner is preset in the encoding and decoding standard, for example, the downsampling proportion corresponding to the downsampling processing manner may be preset to 1/2. Therefore, when the target processing manner corresponding to the current video frame is determined, the corresponding downsampling proportion is determined as 1/2.

Figure 20:
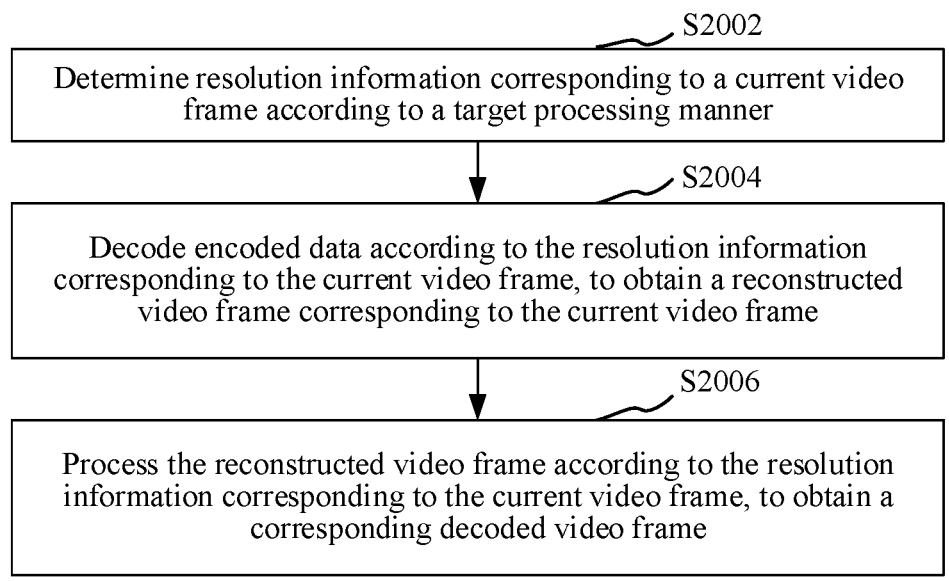
FIG. 20 is a flowchart of decoding encoded data corresponding to a current video frame according to a target processing manner, to obtain a corresponding decoded video frame according to an exemplary embodiment of this application.

In an embodiment, as shown in FIG. 20, the decoding the encoded data corresponding to the current video frame according to the target processing manner, to obtain a corresponding decoded video frame includes the following steps:

Step S2002: Determine resolution information corresponding to the current video frame according to the target processing manner.

For example, after obtaining the target processing manner, the computer device determines the corresponding resolution information according to the target processing manner. For example, the encoded data carries downsampling proportion information corresponding to the current video frame. For example, the sequence-level header information of the video sequence carries downsampling proportion information corresponding to the downsampling proportion when the target processing manner corresponding to the current video frame is the downsampling processing manner. When it is obtained that the target processing manner is the downsampling processing manner, the downsampling proportion corresponding to the current video frame is determined according to the downsampling proportion information in the encoded data. Alternatively, a downsampling proportion corresponding to that the target processing manner corresponding to the input video frame is the downsampling processing manner is preset in the encoding and decoding standard, for example, the downsampling proportion corresponding to the downsampling processing manner may be preset to 1/2. Therefore, when the target processing manner corresponding to the current video frame is determined as the downsampling processing manner, the corresponding downsampling proportion is determined as 1/2.

Step S2004: Decode the encoded data according to the resolution information corresponding to the current video frame, to obtain a reconstructed video frame corresponding to the current video frame.

Optionally, the reconstructed video frame is a video frame obtained through decoding and reconstruction. It may be understood that, resolution information corresponding to the reconstructed video frame corresponds to resolution information of a current frame in an encoding process. If there is no loss in image information in the encoding process, the reconstructed video frame is the same as the current frame. If there is a loss in image information in the encoding process, a difference between the reconstructed video frame and the current frame corresponds to a loss value. The encoded data is decoded according to the resolution information corresponding to the current video frame. Decoding may include at least one of prediction, inverse transform, dequantization, and entropy decoding, and is specifically determined according to an encoding process. During decoding, the computer device processes at least one of a current reference frame, location information corresponding to each current block of the current video frame, location information corresponding to each reference block in the current reference frame, and a motion vector according to the resolution information of the current video frame. The processing method matches a processing method used by an encoding end for encoding. For example, the computer device may obtain the current reference frame corresponding to the current video frame, process the current reference frame according to resolution information corresponding to the current video frame, to obtain a target reference frame, obtain a target reference block according to carried motion vector information, obtain a predicted value corresponding to the current block according to the target reference block, and obtain the reconstructed video frame according to a prediction residual in the encoded data and the predicted value.

In an embodiment, when an encoding end transforms location information, when obtaining the corresponding location information in a decoding process, the location information needs to be correspondingly transformed, to keep consistency between the target reference blocks obtained by the encoding end and the decoding end.

In an embodiment, when the motion vector information carried in the encoded data is a target motion vector, the target motion vector may be transformed according to target motion vector unit resolution information and the resolution information corresponding to the current video frame, to obtain a first motion vector in the resolution information corresponding to the current video frame, and obtain a target reference block corresponding to the current block according to the first motion vector.

In an embodiment, when the motion vector information carried in the encoded data is a motion vector difference, an initial predicted motion vector corresponding to a current block is obtained, a motion vector difference corresponding to each current block and the initial predicted motion vector are processed in the same resolution, to obtain a first motion vector that corresponds to a corresponding current block and that is in a resolution of the current video frame, and obtain a target reference block corresponding to the current block according to the first motion vector.

Optionally, both the motion vector difference and the initial predicted motion vector are transformed into motion vectors corresponding to the same resolution. For example, the initial predicted motion vector may be transformed into a target predicted motion vector in the target resolution, the target motion vector is obtained according to the target predicted motion vector and the motion vector difference, and then the target motion vector is transformed into the first motion vector in the resolution of the current video frame. The initial predicted motion vector may alternatively be transformed into a predicted motion vector in the resolution of the current video frame, the motion vector difference is transformed into a motion vector difference in the solution of the current video frame, and the first motion vector is obtained according to the motion vector difference in the resolution of the current video frame and the predicted motion vector in the resolution of the current video frame.

Step S2006: Process the reconstructed video frame according to the resolution information corresponding to the current video frame, to obtain a corresponding decoded video frame.

Optionally, processing performed on the reconstructed video frame may be sampling, for example, upsampling. A method for processing the reconstructed video frame may correspond to a method for processing the input video frame during encoding. For example, when the processing manner of the input video frame is the downsampling processing manner, and a downsampling proportion of the resolution information is 1/2, the reconstructed video frame is upsampled, and the upsampling proportion may be 2.

In an embodiment, when the decoding end determines, from header information of the encoded data, that the encoded data is obtained through encoding by using the downsampling processing manner, the decoding end may also obtain, from the header information, the used downsampling proportion information or downsampling method information, and upsample the reconstructed video frame by using an upsampling proportion and an upsampling method that match the downsampling proportion information or the downsampling method information, to obtain the decoded video frame. For example, the sampling proportion corresponding to the downsampling proportion information is 1/2, and the decoding end needs to upsample the reconstructed video frame by using a sampling proportion of 2 and an upsampling method that matches the downsampling method information, to obtain the decoded video frame. The decoding end may obtain, from any one of sequence-level header information, group-level header information, frame-level header information, and block-level header information, downsampling proportion information or downsampling method information corresponding to the current encoded data.

According to the foregoing video decoding method, the encoded data corresponding to the current video frame is obtained, the resolution information corresponding to the current video frame is obtained, the encoded data is decoded according to the resolution information corresponding to the current video frame, to obtain the reconstructed video frame corresponding to the current video frame, and the reconstructed video frame is processed according to the resolution information corresponding to the current video frame, to obtain the corresponding decoded video frame. Therefore, during decoding, decoding may be flexibly performed according to the resolution information corresponding to the current video frame, to obtain the decoded video frame, and decoding is performed in the resolution of the current video frame, so that an accurate decoded video frame can be obtained.

In an embodiment, reconstructed video frames corresponding to current video frames of the to-be-decoded video sequence are processed into the same resolution, and for example, the reconstructed video frame is processed into a decoded video frame that has a resolution the same as the original resolution of the input video frame.

Figure 21:
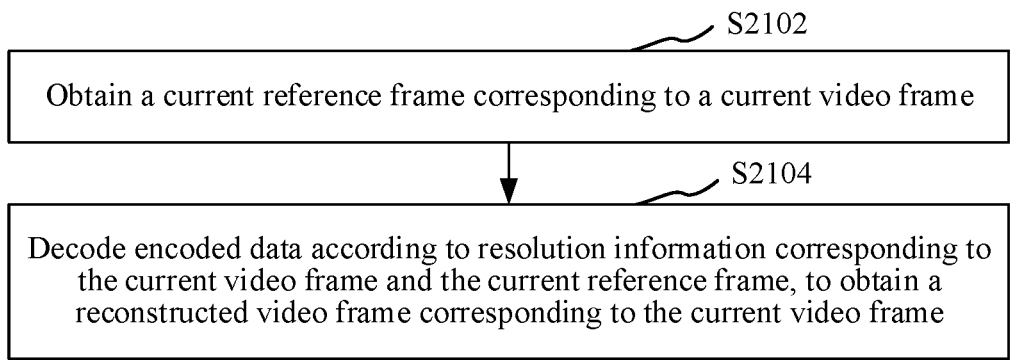
FIG. 21 is a flowchart of decoding encoded data according to resolution information corresponding to a current video frame, to obtain a reconstructed video frame corresponding to the current video frame according to an exemplary embodiment of this application.

In an embodiment, as shown in FIG. 21, step S2004, that is, decoding the encoded data according to the resolution information corresponding to the current video frame, to obtain a reconstructed video frame corresponding to the current video frame includes the following steps:

Step S2102: Obtain a current reference frame corresponding to the current video frame.

Optionally, there may be one or more reference frames corresponding to the current video frame. For example, when the current video frame is a P frame, there may be one corresponding reference frame. When the current video frame is a B frame, there may be two corresponding reference frames. A reference frame corresponding to the current video frame may be obtained according to a reference relationship, and the reference relationship may be different according to each video encoding and decoding standard. For example, when the second video frame in a GOP is a B frame, a corresponding current video frame may be an I frame of the group of pictures and the fourth frame of the group of pictures. Alternatively, the current reference frame corresponding to the current video frame may be first one or two frames in forward encoded frames thereof. It may be understood that, the current reference frame is consistent with the current reference frame in the encoding process.

In an embodiment, the obtaining a current reference frame corresponding to the current video frame includes: obtaining a second reference rule, the second reference rule including a size relationship between a resolution of the current video frame and a resolution of the current reference frame; and obtaining the current reference frame corresponding to the current video frame according to the second reference rule.

Optionally, the second reference rule determines the size relationship between the resolution of the current video frame and the resolution of the current reference frame. It may be understood that, to ensure consistency between the current reference frame obtained in the encoding process and the reference frame obtained in the decoding process, the first reference rule is consistent with the second reference rule. The first reference rule and the second reference rule may be preset in an encoding and decoding standard. Alternatively, during encoding, the first reference rule may be selected according to an application scenario, a real-time performance requirement, and the like of encoding, and reference rule information is added to the encoded data. The decoder obtains the second reference rule according to the reference rule information in the encoded data. The resolution size relationship includes at least one of that the current video frame is the same as the reference frame and that the current video frame is different from the reference frame. When the second reference rule includes that the resolution of the current video frame is the same as the resolution of the reference frame, the second reference rule may further include a processing manner reference rule of the resolution of the current video frame and the current reference frame. For example, the processing manner reference rule may include one or two of the following: a current video frame with a full-resolution processing manner may refer to a current reference frame with a full-resolution processing manner, and a current video frame with a downsampling processing manner may refer to a current reference frame with a downsampling processing manner. When the second reference rule includes that the resolution of the current video frame is different from the resolution of the reference frame, the second reference rule may further include one or two of that the resolution of the current video frame is greater than the resolution of the current reference frame and the current video frame is less than the resolution of the current reference frame. Therefore, the second reference rule may include one or more of the following: a current video frame with an original resolution may refer to a reference frame with a downsampling resolution, a current video frame with a downsampling resolution may refer to a reference frame with an original resolution, a current video frame with an original resolution may refer to a reference frame with an original resolution, and a current video frame with a downsampling resolution may refer to a reference frame with a downsampling resolution. The current video frame with an original resolution refers to that the resolution of the current video frame is the same as the resolution of the corresponding input video frame, and the reference frame with an original resolution refers to that the resolution of the reference frame is the same as the resolution of the corresponding input video frame. The current video frame with a downsampling resolution refers to that resolution information corresponding to the current video frame is downsampling. The reference frame with a downsampling resolution refers to that the resolution information corresponding to the reference frame is downsampling. After the second reference rule is obtained, the current reference frame corresponding to the current video frame is obtained according to the second reference rule, so that the obtained current reference frame meets the second reference rule.

Step S2104: Decode the encoded data according to the resolution information corresponding to the current video frame and the current reference frame, to obtain the reconstructed video frame corresponding to the current video frame.

Optionally, the computer device may obtain, from the current reference frame, a reference block corresponding to a current block of the current video frame, and decode the current block according to the reference block. The computer device may alternatively process the current reference frame according to the resolution information of the current video frame, to obtain a corresponding target reference frame, obtain, from the target reference frame, a target reference block corresponding to the current block of the current video frame, and decode the current block according to the target reference block, to obtain the reconstructed video frame corresponding to the current video frame.

In an embodiment, step S1704, that is, decoding the encoded data according to the resolution information corresponding to the current video frame and the current reference frame, to obtain the reconstructed video frame corresponding to the current video frame includes: sampling the current reference frame according to the resolution information corresponding to the current video frame, to obtain a corresponding target reference frame; and decoding the current video frame according to the target reference frame, to obtain the reconstructed video frame corresponding to the current video frame.

Optionally, the target reference block is obtained from the target reference frame according to carried motion vector information, a predicted value corresponding to the current block is obtained according to the target reference block, and the reconstructed video frame is obtained according to a prediction residual in the encoded data and the predicted value.

In an embodiment, the sampling the current reference frame according to the resolution information corresponding to the current video frame, to obtain a corresponding target reference frame includes: sampling the current reference frame according to the resolution information of the current video frame and motion estimation pixel precision, to obtain the corresponding target reference frame.

In an embodiment, the sampling the current reference frame according to the resolution information of the current video frame and motion estimation pixel precision, to obtain the corresponding target reference frame includes: calculating pixel interpolation precision according to the resolution information of the current video frame and the motion estimation pixel precision; and directly performing subpixel interpolation on the current reference frame according to the pixel interpolation precision, to obtain the corresponding target reference frame.

In an embodiment, the sampling the current reference frame according to the resolution information of the current video frame and motion estimation pixel precision, to obtain the corresponding target reference frame includes: sampling the current reference frame according to the resolution information of the current video frame, to obtain an intermediate reference frame; and performing subpixel interpolation on the intermediate reference frame according to the motion estimation pixel precision, to obtain the target reference frame.

Optionally, the resolution of the current video frame is consistent with the resolution of the current video frame, and the obtained target reference frames are also consistent. Therefore, a method for sampling the current reference frame according to the resolution information corresponding to the current video frame, to obtain the corresponding target reference frame is consistent with a method for sampling the current reference frame according to the resolution information of the current frame in the encoding end, to obtain the corresponding target reference frame. Details are not described herein again in this embodiment of this application.

In an embodiment, the decoding end may also obtain, from header information of the encoded data, sampling manner information corresponding to the current video frame. The decoding end may specifically obtain, from any one of sequence-level header information, group-level header information, and frame-level header information, subpixel interpolation manner information corresponding to the current video frame.

Figure 22:
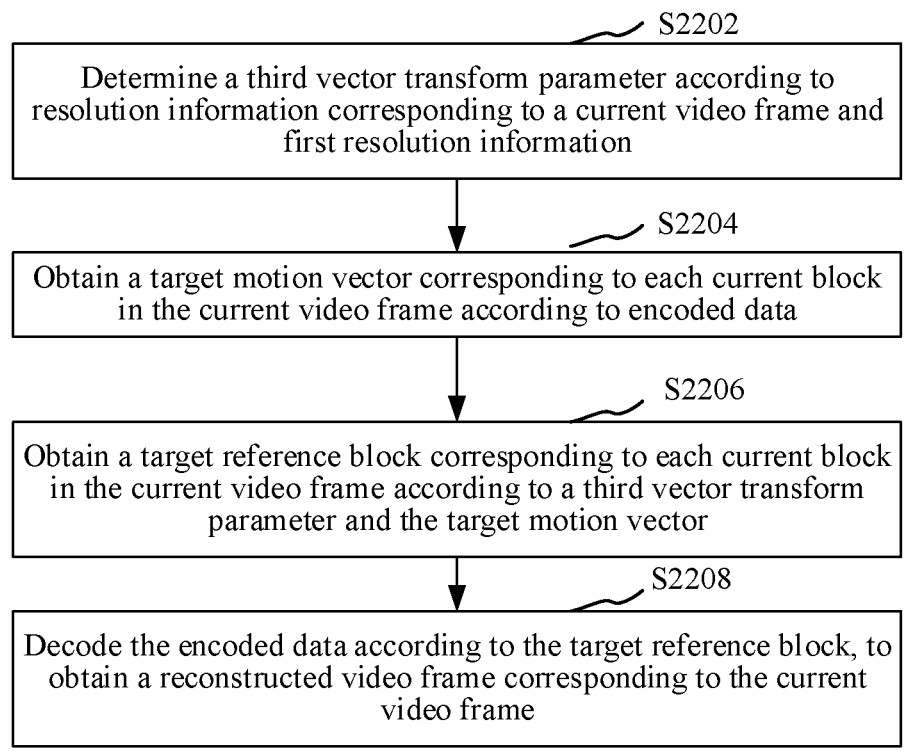
FIG. 22 is a flowchart of decoding encoded data according to resolution information corresponding to a current video frame and a current reference frame, to obtain a reconstructed video frame corresponding to the current video frame according to an exemplary embodiment of this application.

In an embodiment, as shown in FIG. 22, step S2104, that is, decoding the encoded data according to the resolution information corresponding to the current video frame and the current reference frame, to obtain the reconstructed video frame corresponding to the current video frame includes the following steps:

Step S2202: Determine a third vector transform parameter according to the resolution information corresponding to the current video frame and first resolution information, the first resolution information including target motion vector unit resolution information or resolution information of the current reference frame.

Optionally, the third vector transform parameter is used for transforming location information of an obtained motion vector or the motion vector. The third vector transform parameter may be a ratio of the first resolution information to the resolution information of the current video frame, and the third vector transform parameter corresponds to the first vector transform parameter. When the target motion vector is transformed by using the third vector transform parameter, the target motion vector may be transformed into a motion vector corresponding to a resolution corresponding to the current video frame, and the third vector transform parameter may be a reciprocal of the first vector transform parameter. When location information corresponding to the motion vector is transformed by using the third vector transform parameter, if the first vector transform parameter in the encoding end is used for transforming the first location information, because the location information of the current block is the same as that of the code block, the third vector transform parameter is the same as the first vector transform parameter. If the first vector transform parameter in the encoding end is used for transforming the second location information, because a location value calculated according to the target motion vector and the first location information is a location value obtained after transforming the second location information according to the first vector transform parameter in the encoding end, the third vector transform parameter is a reciprocal of the first vector transform parameter.

Step S2204: Obtain a target motion vector corresponding to each current block in the current video frame according to the encoded data.

Optionally, when the encoded data carries the target motion vector, the computer device reads the target motion vector from the encoded data. When the encoded data carries the motion vector difference, the target predicted motion vector may be calculated, and the target motion vector is obtained according to the motion vector difference and the target predicted motion vector.

Step S2206: Obtain a target reference block corresponding to each current block in the current video frame according to the third vector transform parameter and the target motion vector.

Optionally, after obtaining the third vector transform parameter, the computer device transforms the obtained motion vector or the location information corresponding to the motion vector according to the third vector transform parameter, to obtain the location information corresponding to the target reference block, and obtain the target reference block.

Step S2208: Decode the encoded data according to the target reference block, to obtain a reconstructed video frame corresponding to the current video frame.

Optionally, after obtaining the target reference block, the computer device obtains a pixel value of each image block of the reconstructed video frame according to a pixel value of the target reference block and the prediction residual that is of the current block and that is carried in the encoded data, to obtain the reconstructed video frame.

In an embodiment, step S2202, that is, determining a third vector transform parameter according to the resolution information corresponding to the current video frame and first resolution information includes: determining a third vector transform parameter according to the resolution information corresponding to the current video frame and resolution information of the current reference frame, and step S2206, that is, obtaining a target reference block corresponding to each current block in the current video frame according to the third vector transform parameter and the target motion vector includes: obtaining first location information corresponding to a current block; and obtaining a target reference block corresponding to the current block according to the first location information, the third vector transform parameter, and the target motion vector.

Optionally, the computer device may obtain the second location information corresponding to the target reference block according to the first location information, the third vector transform parameter, and the target motion vector, and obtain the target reference block according to the second location information. Due to correspondence between encoding and decoding, if the first vector transform parameter in the encoding end is used for transforming the first location information, because the location information of the current block is the same as that of the code block, the third vector transform parameter is the same as the first vector transform parameter. If the first vector transform parameter in the encoding end is used for transforming the second location information, because a location value calculated according to the target motion vector and the first location information is a location value obtained after transforming the second location information according to the first vector transform parameter in the encoding end, the third vector transform parameter is a reciprocal of the first vector transform parameter.

For example, the resolution of the current video frame is 1200*1200 pixels, and the resolution of the current reference frame is 600*600 pixels. The first vector transform parameter is used for transforming the second location information, the first vector transform parameter is 2, and the third vector transform parameter is 1/2. Assuming that the first location information is (6, 8), and the target motion vector is (0, 2), the intermediate location information is (6, 8)−(0, 2)=(6, 6), and the second location information corresponding to the target reference block is (6*1/2, 6*1/2)= (3, 3).

For example, the resolution of the current video frame is 1200*1200 pixels, the resolution of the current reference frame is 600*600 pixels, the first vector transform parameter is used for transforming the first location information, the first vector transform parameter is 1/2, and the third vector transform parameter is 1/2. Assuming that the first location information is (6, 8), the target motion vector is (0, 1), and the second location information is (6*1/2, 8*1/2)−(0, 1)=(3, 3).

In an embodiment, step S2202, that is, determining a third vector transform parameter according to the resolution information corresponding to the current video frame and first resolution information includes: determining a third vector transform parameter according to the resolution information corresponding to the current video frame and target motion vector unit resolution information, and step S2204, that is, obtaining a target reference block corresponding to each current block in the current video frame according to the third vector transform parameter and the target motion vector includes: obtaining a first motion vector according to the target motion vector and the third vector transform parameter; and obtaining a target reference block corresponding to a current block according to the first motion vector.

Optionally, the third vector transform parameter is determined according to the resolution information corresponding to the current video frame and the target motion vector unit resolution information, and is used for transforming the target motion vector into a first motion vector corresponding to the resolution corresponding to the current frame. After the third vector transform parameter is obtained, the third vector transform parameter may be multiplied by the target motion vector, and the obtained product is used as the first motion vector. It may be understood that, the process of obtaining the first motion vector according to the third vector transform parameter and the target motion vector is an inverse process of obtaining the target motion vector corresponding to the current code block according to the first vector transform parameter and the first motion vector. For example, in the encoding end, the first vector transform parameter of the code block corresponding to the current block is 2. The obtained first motion vector is (2, 2), and the target motion vector obtained according to the product of the first vector transform parameter and the first motion vector (2, 2) is (4, 4). In this case, in the decoding process, the third vector transform parameter is 1/2, the obtained target motion vector is (4, 4), and the first motion vector obtained according to a product of the third vector transform parameter 1/2 and the target motion vector (4, 4) is (2, 2).

In an embodiment, when the encoded data carries the motion vector difference, the obtaining a target motion vector corresponding to each current block in the current video frame according to the encoded data includes: obtaining a motion vector difference corresponding to a current block in the current video frame according to the encoded data; obtaining an initial predicted motion vector corresponding to the current block; obtaining a second vector transform coefficient according to current motion vector unit resolution information corresponding to the initial predicted motion vector and the target motion vector unit resolution information; obtaining a target predicted motion vector corresponding to the current block according to the initial predicted motion vector and the second vector transform coefficient; and obtaining the target motion vector according to the target predicted motion vector and the motion vector difference.

Optionally, because the current block in the decoding process corresponds to the current block in the encoding process, and initial predicted motion vector obtaining rules are the same, the initial predicted motion vector corresponding to the current block is consistent with the initial predicted motion vector corresponding to the current block. For the method for obtaining the target predicted motion vector, refer to the method in the encoding process, and details are not described herein again. The target motion vector is a sum of the target predicted motion vector and the motion vector difference.

In an embodiment, before the obtaining encoded data corresponding to a current video frame, the method further includes: obtaining a to-be-decoded video sequence corresponding to the current video frame, and obtaining a video sequence decoding mode corresponding to the to-be-decoded video sequence, the video sequence decoding mode including a constant resolution decoding mode or a hybrid resolution decoding mode; performing the hybrid resolution video decoding method on each current video frame of the to-be-decoded video sequence in a case that the video sequence decoding mode is the hybrid resolution decoding mode; and performing constant resolution decoding on the to-be-decoded video sequence in a case that the video sequence decoding mode is the constant resolution decoding mode.

Optionally, the computer device may obtain video sequence encoding mode information from the encoded data, and obtain the video sequence decoding mode according to the video sequence encoding mode information. For example, when the video sequence encoding mode corresponding to the video sequence encoding mode information is the constant resolution encoding mode, the corresponding video sequence decoding mode is the constant resolution decoding mode, and in the constant resolution decoding mode, resolutions of current video frames of the video sequence are consistent. When the video sequence encoding mode corresponding to the video sequence encoding mode information is the hybrid resolution encoding mode, the corresponding video sequence decoding mode is the hybrid resolution decoding mode.

In an embodiment, the computer device may also determine, from header information of the encoded data, a decoding framework corresponding to the current video frame. Optionally, the decoding end may obtain, from sequence-level header information corresponding to the encoded data, an encoding framework used when each input video frame in the input video frame sequence corresponding to the current encoded data is encoded, to determine a decoding framework that is of the current video frame and that matches the encoding framework. For example, when a flag bit Sequence_Mix_Flag used for determining the used encoding framework in the sequence-level header information of the encoded data is 0, it indicates that the encoding framework with a constant resolution is used when each input video frame in the input video frame sequence is encoded, and the decoding end may decode the encoded data by using a decoding framework with a constant resolution, to obtain a reconstructed video frame corresponding to the current video frame. When flag bit Sequence_Mix_Flag is 1, it indicates that the encoding framework with a hybrid resolution is used when each input video frame in the input video frame sequence is encoded, and the decoding end may decode the encoded data by using a decoding framework with a hybrid resolution, to obtain a reconstructed video frame sequence.

In an embodiment, the obtaining a video sequence decoding mode corresponding to the to-be-decoded video sequence may include: obtaining current environmental information, the current environmental information including at least one of current encoding environmental information and current decoding environmental information; and determining the target video sequence decoding mode corresponding to the to-be-decoded video sequence according to the current environmental information.

Optionally, the decoding end may also obtain the corresponding target video sequence decoding mode by using a method for calculating the video sequence encoding mode by the encoding end. Therefore, in this embodiment of this application, determining the target video sequence decoding mode according to current environmental information is consistent with determining the target video sequence encoding mode according to the current environmental information, and details are not described herein again.

In an embodiment, the current environmental information includes an application scenario corresponding to the to-be-decoded video sequence, and the video sequence decoding mode corresponding to the to-be-decoded video sequence may be obtained according to the application scenario.

The video decoding method is described below by using decoding encoded data corresponding to a video sequence A as an example. It is assumed that names of current video frames corresponding to input video frames a, b, and c at the decoding end are respectively e, f, and g.

1. A receiving terminal obtains the encoded data corresponding to the video sequence A, and obtains, from sequence header information corresponding to the encoded data, that the target video sequence encoding mode is the hybrid resolution encoding mode, and therefore, the encoded data is decoded by using a hybrid resolution decoding framework.

2. A resolution information obtaining unit of the hybrid resolution decoding framework obtains resolution information corresponding to the first current video frame e. It may be understood that, the encoded data corresponding to e is data obtained by encoding a1. Intra-frame decoding is performed on e, to obtain a reconstructed video frame e1. Because resolution information corresponding to e is 1/2, the reconstructed video frame e1 may be upsampled by using a sampling proportion of 2, to obtain a decoded video frame e2.

3. A resolution information obtaining unit of the hybrid resolution decoding framework obtains resolution information corresponding to the second current video frame f. It may be understood that, the encoded data corresponding to f is data obtained by encoding b1. Inter-frame decoding is performed on f, to obtain a reconstructed video frame f1. Because resolution information corresponding to f is a downsampling proportion of 1/4, the reconstructed video frame f1 may be upsampled by using a sampling proportion of 4, to obtain a decoded video frame f2.

The decoding process is as follows: because f is an inter predicted frame, the reconstructed video frame e1 needs to be used as the current reference frame. It may be understood that, e1 is the same as a2, and sampling the same as that performed on a2 is performed on e1, to obtain e3, and herein, e3 is the same as a3, and is a target reference frame. It is obtained from the encoded data that the motion vector difference corresponding to the current block is MVD1, because MVD1 is in the target resolution, that is, the original resolution, MVD1 needs to be transformed to be in a resolution corresponding to f, and therefore, it may be obtained that MVD3 is (MVD1)/4. It is obtained that an initial predicted vector is MV2. The initial predicted vector is calculated in a resolution corresponding to the 1/4 downsampling proportion, and the resolution is the same as a resolution corresponding to f. Therefore, it may be obtained that the first motion vector is MV1, equal to (MVD1)/4+MV2. The target reference block is obtained according to MV1. A predicted value corresponding to the current block is obtained according to the target reference block, and the reconstructed block corresponding to the reconstructed video frame f1 is obtained by adding the prediction residual p1 and the predicted value and reconstruction.

4. A resolution information obtaining unit of the hybrid resolution decoding framework obtains encoded data corresponding to the third current video frame g. It may be understood that, the encoded data corresponding to g is data obtained by encoding c1. Inter-frame decoding is performed on g, to obtain a reconstructed video frame g1. Because resolution information corresponding to g is 1/8, the reconstructed video frame f1 may be upsampled by using a sampling proportion of 8, to obtain a decoded video frame g2.

The decoding process is as follows: because g is an inter predicted frame, the reconstructed video frame f1 needs to be used as the current reference frame. It may be understood that, f1 is the same as b2, and sampling the same as that performed on b2 is performed on f1, to obtain f3, and herein, f3 is the same as b3, and is a target reference frame. It is obtained from the encoded data that the motion vector difference corresponding to the current block is MVD2, because MVD2 is in the target resolution, that is, the original resolution, MVD2 needs to be transformed to be in a resolution corresponding to g, and therefore, it may be obtained that MVD2 is (MVD1)/8. It is obtained that an initial predicted vector is MV4, and because the initial predicted vector is calculated in a resolution corresponding to the 1/4 downsampling proportion, the initial predicted vector needs to be transformed to be in a resolution corresponding to f A downsampling proportion corresponding to f is 1/8. Therefore, it may be obtained that the first motion vector is MV3, equal to (MVD2)/8+(MV4)/2. The target reference block is obtained according to MV3. A predicted value corresponding to the current block is obtained according to the target reference block, and the reconstructed block corresponding to the reconstructed video frame g1 is obtained by adding the prediction residual p2 and the predicted value and reconstruction.

5. The receiving terminal plays e2, f2, and g2.

Figure 23:
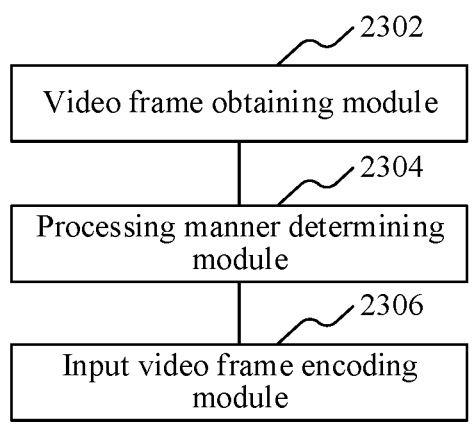
FIG. 23 is a structural block diagram of a video encoding apparatus according to an exemplary embodiment of this application.

As shown in FIG. 23, in an embodiment, a video encoding apparatus is provided. The video encoding apparatus may be integrated into the foregoing server 120 or terminal 110, and may include an input video frame obtaining module 2302, a processing manner determining module 2304, and an input video frame encoding module 2306.

The input video frame obtaining module 2302 is configured to obtain an input video frame.

The processing manner determining module 2304 is configured to: obtain a processing parameter corresponding to the input video frame, and determine, from candidate processing manners according to the processing parameter, a target processing manner corresponding to the input video frame, the candidate processing manners including any one of a full-resolution processing manner and a downsampling processing manner.

The input video frame encoding module 2306 is configured to encode the input video frame according to the target processing manner, to obtain encoded data corresponding to the input video frame.

In an optional embodiment, the encoded data includes target processing manner information corresponding to the target processing manner, and the input video frame encoding module 2306 is further configured: add the target processing manner information corresponding to the target processing manner to the encoded data corresponding to the input video frame in a case that the processing parameter cannot be reproduced in a decoding process.

In an optional embodiment, the input video frame encoding module 2306 is further configured to: add target processing manner information corresponding to the target processing manner to frame-level encoding header information corresponding to the input video frame.

In an optional embodiment, the target processing manner information includes a flag bit describing the target processing manner.

The input video frame encoding module 2306 is further configured to add, in a case that the target processing manner is the full-resolution processing manner, the flag bit assigned with a first value to the frame-level encoding header information corresponding to the input video frame.

The input video frame encoding module 2306 is further configured to add, in a case that the target processing manner is the downsampling processing manner, the flag bit assigned with a second value to the frame-level encoding header information corresponding to the input video frame.

In an optional embodiment, the processing manner determining module 2304 is further configured to: obtain a frame type corresponding to the input video frame, and obtain a processing parameter corresponding to the input video frame according to the frame type.

In an optional embodiment, the processing manner determining module 2304 is further configured to: calculate a proportion of a target predicted type code block in the forward encoded video frame; and determine the target processing manner corresponding to the input video frame according to the proportion.

In an optional embodiment, the processing manner determining module 2304 is further configured to: calculate a proportion of the intra-frame code block of the forward encoded video frame in the forward encoded video frame, and the determining the target processing manner corresponding to the input video frame according to the proportion includes: when the proportion is greater than a target threshold, determining the target processing manner as the downsampling processing manner.

In an optional embodiment, the processing manner determining module 2304 is further configured to: obtain a processing manner of processing the reference fame corresponding to the input video frame, and determine the target threshold according to the processing manner of processing the reference frame.

In an optional embodiment, the processing manner determining module 2304 is further configured to: obtain a current quantization parameter corresponding to the input video frame; obtain a quantization parameter threshold corresponding to the input video frame; and determine the target processing manner corresponding to the input video frame according to a size relationship between the current quantization parameter and the quantization parameter threshold.

In an optional embodiment, the input video frame encoding module 2306 is further configured to: process the input video frame according to the target processing manner, to obtain the current frame; and encode the current frame in the resolution of the current frame, to obtain encoded data corresponding to the input video frame.

Figure 24:
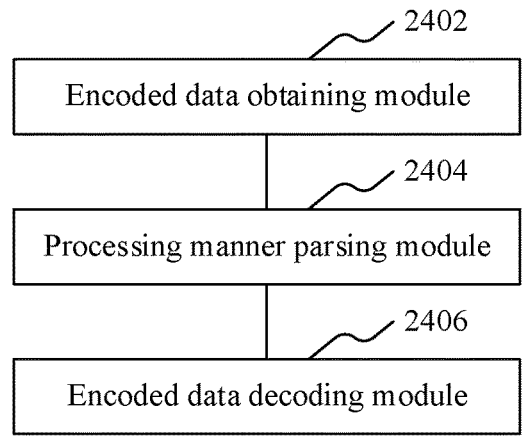
FIG. 24 is a structural block diagram of a video decoding apparatus according to an exemplary embodiment of this application.

As shown in FIG. 24, in an embodiment, a video decoding apparatus is provided. The video decoding apparatus may be integrated into the foregoing server 120 or terminal 110, and may specifically include an encoded data obtaining module 2402, a processing manner parsing module 2404, and an encoded data decoding module 2406.

The encoded data obtaining module 2402 is configured to obtain encoded data corresponding to a current video frame.

The processing manner parsing module 2404 is configured to parse out, from the encoded data, a target processing manner corresponding to the current frame, the target processing manner being one of candidate processing manners, the candidate processing manners including a full-resolution processing manner, and a downsampling processing manner.

The encoded data decoding module 2406 is configured to decode the encoded data corresponding to the current video frame according to the target processing manner, to obtain a corresponding decoded video frame.

In an optional embodiment, the encoded data decoding module 2406 is further configured to: determine the resolution information corresponding to the current video frame according to the target processing manner; decode the encoded data according to the resolution information corresponding to the current video frame, to obtain a reconstructed video frame corresponding to the current video frame; and process the reconstructed video frame according to the resolution information corresponding to the current video frame, to obtain a corresponding decoded video frame.

Figure 25:
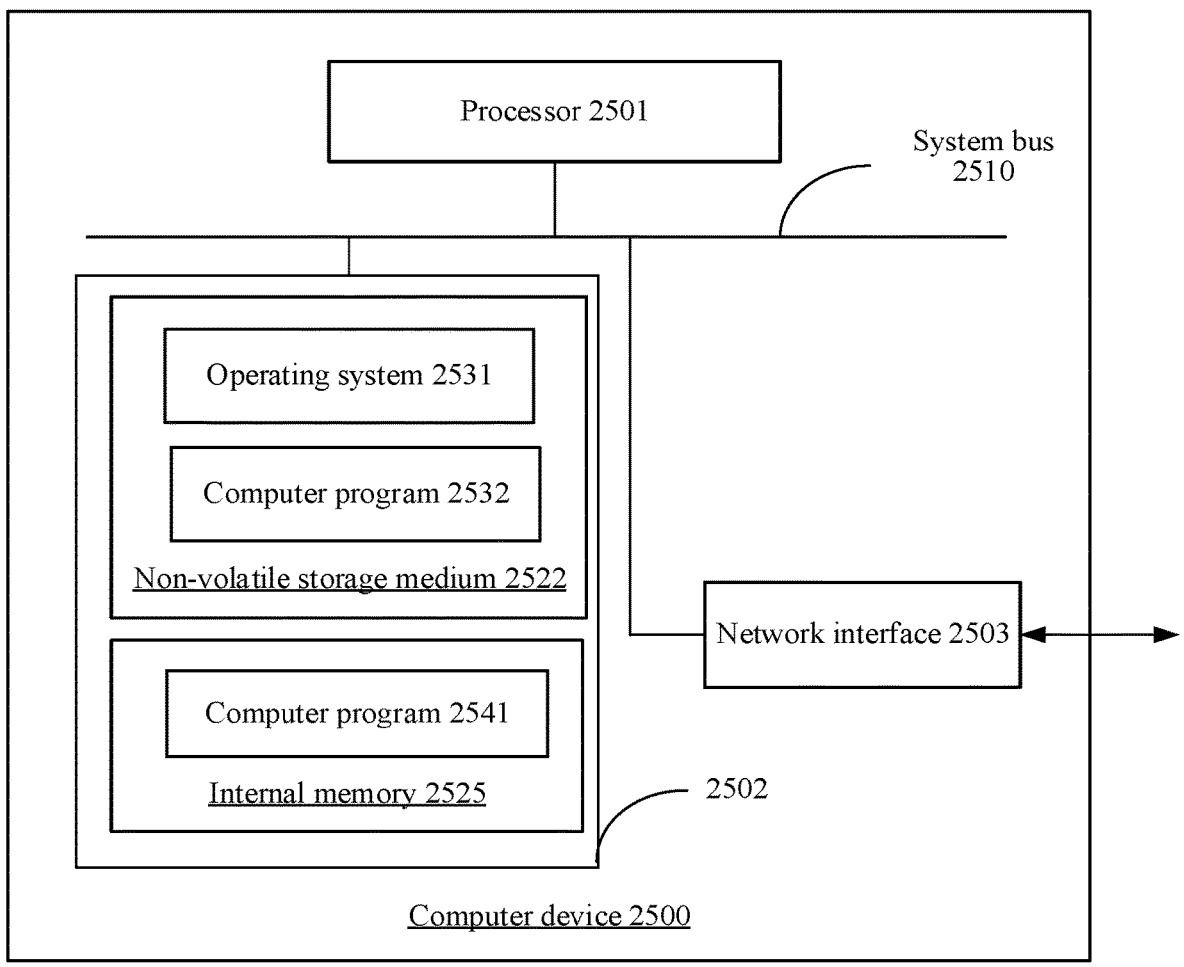
FIG. 25 is a block diagram of an internal structure of a computer device according to an exemplary embodiment of this application.

FIG. 25 is a diagram of an internal structure of a computer device 2500 according to an embodiment. The computer device 2500 may be specifically a terminal or a server. As shown in FIG. 25, the computer device 2500 includes a processor 2501, a memory 2502, and a network interface 2503 that are connected through a system bus 2510. The memory 2502 includes a non-volatile storage medium 2522 and an internal memory 2525. The non-volatile storage medium 2522 of the computer device 2500 stores an operating system 2531, and may further store a computer program 2532. The computer program 2532, when executed by the processor 2501, may cause the processor 2501 to implement at least one of the video encoding method and the video decoding method. The internal memory 2525 may also store a computer program 2541. The computer program 2541, when executed by the processor 2501, may cause the processor 2501 to perform at least one of the video encoding method and the video decoding method. A person skilled in the art may understand that, the structure shown in FIG. 25 is merely a block diagram of a partial structure related to a solution in this application, and does not constitute a limitation to the computer device to which the solution in this application is applied. Specifically, the computer device may include more components or fewer components than those shown in the figure, or some components may be combined, or a different component deployment may be used.

In an embodiment, the video decoding apparatus provided in this application may be implemented in a form of a computer program, and the computer program may run on the computer device shown in FIG. 25. The memory of the computer device may store program modules that form the video decoding apparatus, such as the input video frame obtaining module 2302, the processing manner determining module 2304, and the input video frame encoding module 2306 that are shown in FIG. 23. The computer program formed by the various program modules causes the processor to perform the steps of the video encoding method in the embodiments of this application described in this specification. For example, the computer device shown in FIG. 25 may obtain the input video frame by using the input video frame obtaining module 2302 in the video encoding apparatus shown in FIG. 23; determine a processing manner corresponding to the input video frame by using the processing manner determining module 2304; and encode the input video frame by using the input video frame encoding module 2306.

In an embodiment, the video decoding apparatus provided in this application may be implemented in a form of a computer program, and the computer program may run on the computer device shown in FIG. 25. The memory of the computer device may store various program modules that form the video decoding apparatus, for example, the encoded data obtaining module 2402, the processing manner parsing module 2404, and the encoded data decoding module 2406 that are shown in FIG. 24. The computer program formed by the various program modules causes the processor to perform the steps of the video decoding method in the embodiments of this application that are described in this specification. For example, the computer device shown in FIG. 25 may obtain the encoded data corresponding to the current video frame by using the encoded data obtaining module 2402 in the video decoding apparatus shown in FIG. 24; parse out, from the encoded data, the processing manner corresponding to the current video frame by using the processing manner parsing module 2404; and decode the encoded data by using the encoded data decoding module 2406, to obtain a corresponding decoded video frame.

In an optional embodiment, an embodiment of this application further provides a computer device, including a processor and a memory, the memory storing at least one instruction, at least one program, a code set, or an instruction set, the at least one instruction, the at least one program, the code set or the instruction set being loaded and executed by the processor to implement the video encoding method or the video decoding method in the embodiments of this application.

In an optional embodiment, an embodiment of this application further provides a computer-readable storage medium, the computer-readable storage medium storing at least one instruction, at least one program, a code set, or an instruction set, the at least one instruction, the at least one program, the code set or the instruction set being loaded and executed by the processor to implement the video encoding method or the video decoding method in the embodiments of this application.

In an optional embodiment, an embodiment of this application further provides a computer program product. The computer product, when run on a computer, causes the computer to perform the video encoding method or the video decoding method in the embodiments of this application.

A person of ordinary skill in the art may understand that all or some of the processes of the methods in the foregoing embodiments may be implemented by a computer program instructing relevant hardware. The program may be stored in a non-volatile computer-readable storage medium. When the program is executed, the processes of the foregoing methods in the embodiments are performed. Any reference to the memory, storage, database, or another medium used in the embodiments provided in this application may include a non-volatile and/or volatile memory. The non-volatile memory may include a read-only memory (ROM), a programmable ROM (PROM), an electrically programmable ROM (EPROM), an electrically erasable programmable ROM (EEPROM) or a flash memory. The volatile memory may include a random access memory (RAM) or an external high-speed cache. As an illustration instead of a limitation, the RAM is available in various forms, such as a Static RAM (SRAM), a Dynamic RAM (DRAM), a Synchronous DRAM (SDRAM), a Double Data Rate SDRAM (DDRS-DRAM), an Enhanced SDRAM (ESDRAM), Synchronous link (Synchlink) DRAM (SLDRAM), a Rambus Direct RAM (RDRAM), a Direct Rambus Dynamic RAM (DRDRAM), and a Rambus Dynamic RAM (DRAM).

Technical features of the foregoing embodiments may be arbitrarily combined. For brevity of the description, not all possible combinations of the technical features in the foregoing embodiments are described. However, as long as the combinations of the technical features are not contradicted, the combinations shall be considered as the scope recorded in this specification.

The foregoing embodiments only show several implementations of this application, and descriptions thereof are in detail, but cannot be understood as a limitation to the patent scope of this application. A person of ordinary skill in the art may further make variations and improvements without departing from the ideas of this application, and the variations and improvements shall fall within the protection scope of this application. Therefore, the protection scope of this patent application is subject to the protection scope of the appended claims.

What is claimed is:

1. A video encoding method, applied to a computer device having a processor and memory storing a plurality of computer programs to be executed by the processor, the method comprising:
    obtaining an input video frame;
    determining a processing parameter corresponding to the input video frame by calculating a proportion of a target predicted type code block in a forward encoded video frame, the calculated proportion comprising a ratio between a number of code blocks of the target predicted type and a total number of code blocks in the forward encoded video frame;
    selecting, from candidate processing manners according to the processing parameter, a target processing manner corresponding to the input video frame, the candidate processing manners comprising a full-resolution processing manner and a downsampling processing manner, the selecting further including:
        comparing the calculated proportion of the target prediction type code block with a target threshold;
        when the calculated proportion exceeds the target threshold, selecting the downsampling processing manner as the target processing manner; and
        when the calculated proportion does not exceed the target threshold, selecting the full-resolution processing manner as the target processing manner; and
    encoding the input video frame according to the target processing manner, to obtain encoded data corresponding to the input video frame, the encoding including:
        adding the target processing manner to the encoded data corresponding to the input video frame when the processing parameter cannot be generated in a decoding process, the processing parameter including at least one of: original image feature information, rate-distortion cost information, and encoded data distortion information that correspond to the input video frame.

2. The method according to claim 1, wherein encoding the input video frame according to the target processing manner comprises:
    adding target processing manner information corresponding to the target processing manner to frame-level encoding header information corresponding to the input video frame.

3. The method according to claim 2, wherein the target processing manner information comprises a flag bit that describes the target processing manner; and
    adding the target processing manner information corresponding to the target processing manner to frame-level encoding header information corresponding to the input video frame comprises:
        when the target processing manner is the full-resolution processing manner, adding the flag bit assigned with a first value to the frame-level encoding header information corresponding to the input video frame; or
        when the target processing manner is the downsampling processing manner, adding the flag bit assigned with a second value to the frame-level encoding header information corresponding to the input video frame.

4. The method according to claim 1, wherein determining the processing parameter corresponding to the input video frame further comprises:
    obtaining a frame type corresponding to the input video frame; and
    determining the processing parameter corresponding to the input video frame according to the frame type.

5. The method according to claim 1, further comprising determining the target processing manner according to the calculated proportion.

6. The method according to claim 5, wherein:
    calculating the proportion of a target predicted type code block in the forward encoded video frame comprises calculating a proportion of an intra-frame code block of the forward encoded video frame in the forward encoded video frame.

7. The method according to claim 1, further comprising:
    obtaining a processing manner of processing a reference frame corresponding to the input video frame; and
    determining the target threshold according to the processing manner of processing the reference frame.

8. The method according to claim 1, wherein determining the processing parameter and selecting the target processing manner comprises:
    obtaining a current quantization parameter corresponding to the input video frame;
    obtaining a quantization parameter threshold corresponding to the input video frame; and
    determining the target processing manner corresponding to the input video frame according to a size relationship between the current quantization parameter and the quantization parameter threshold.

9. The method according to claim 1, wherein encoding the input video frame comprises:
    processing the input video frame according to the target processing manner, to obtain a current frame; and
    encoding the current frame in a resolution of the current frame, to obtain the encoded data corresponding to the input video frame.

10. A computer device, comprising memory and a processor, the memory storing a plurality of computer programs, the computer programs, when executed by the processor, causing the processor to perform a plurality of operations including:

obtaining an input video frame;

determining a processing parameter corresponding to the input video frame by calculating a proportion of a target predicted type code block in a forward encoded video frame, the calculated proportion comprising a ratio between a number of code blocks of the target predicted type and a total number of code blocks in the forward encoded video frame;

selecting, from candidate processing manners according to the processing parameter, a target processing manner corresponding to the input video frame, the candidate processing manners comprising a full-resolution processing manner and a downsampling processing manner, the selecting including:

comparing the calculated proportion of the target prediction type code block with a target threshold;

when the calculated proportion exceeds the target threshold, selecting the downsampling processing manner as the target processing manner; and when the calculated proportion does not exceed the target threshold, selecting the full-resolution processing manner as the target processing manner; and encoding the input video frame according to the target processing manner, to obtain encoded data corresponding to the input video frame, the encoding including:

adding the target processing manner to the encoded data corresponding to the input video frame when the processing parameter cannot be generated in a decoding process, the processing parameter including at least one of: original image feature information, rate-distortion cost information, and encoded data distortion information that correspond to the input video frame.

11. The computer device according to claim 10, wherein encoding the input video frame according to the target processing manner comprises:

adding target processing manner information corresponding to the target processing manner to frame-level encoding header information corresponding to the input video frame.

12. The computer device according to claim 10, wherein determining the processing parameter corresponding to the input video frame further comprises:

obtaining a frame type corresponding to the input video frame; and determining the processing parameter corresponding to the input video frame according to the frame type.

13. The computer device according to claim 10, the plurality of operations further including:

determining the target processing manner corresponding to the input video frame according to the proportion.

14. The computer device according to claim 10, wherein determining the processing parameter and selecting the target processing manner comprises:

obtaining a current quantization parameter corresponding to the input video frame;

obtaining a quantization parameter threshold corresponding to the input video frame; and determining the target processing manner corresponding to the input video frame according to a size relationship between the current quantization parameter and the quantization parameter threshold.

15. The computer device according to claim 10, wherein encoding the input video frame comprises:

processing the input video frame according to the target processing manner, to obtain a current frame; and encoding the current frame in a resolution of the current frame, to obtain the encoded data corresponding to the input video frame.

16. A non-transitory computer-readable medium, storing a plurality of computer programs, the computer programs, when executed by a processor of a computer device, causing the device to perform a plurality of operations comprising:

obtaining an input video frame;

determining a processing parameter corresponding to the input video frame by calculating a proportion of a target predicted type code block in a forward encoded video frame, the calculated proportion comprising a ratio between a number of code blocks of the target predicted type and a total number of code blocks in the forward encoded video frame;

selecting, from candidate processing manners according to the processing parameter, a target processing manner corresponding to the input video frame, the candidate processing manners comprising a full-resolution processing manner and a downsampling processing manner, the selecting including:

comparing the calculated proportion of the target prediction type code block with a target threshold;

when the calculated proportion exceeds the target threshold, selecting the downsampling processing manner as the target processing manner; and when the calculated proportion does not exceed the target threshold, selecting the full-resolution processing manner as the target processing manner; and encoding the input video frame according to the target processing manner, to obtain encoded data corresponding to the input video frame, the encoding including:

adding the target processing manner to the encoded data corresponding to the input video frame when the processing parameter cannot be generated in a decoding process, the processing parameter including at least one of: original image feature information, rate-distortion cost information, and encoded data distortion information that correspond to the input video frame.

17. The non-transitory computer-readable storage medium according to claim 16, the operations further comprising:

determining the target processing manner corresponding to the input video frame according to the proportion.

18. The non-transitory computer-readable storage medium according to claim 16, wherein determining the processing parameter and selecting the target processing manner corresponding to the input video frame comprises:

obtaining a current quantization parameter corresponding to the input video frame;

obtaining a quantization parameter threshold corresponding to the input video frame; and determining the target processing manner corresponding to the input video frame according to a size relationship between the current quantization parameter and the quantization parameter threshold.

* * * * *